United States Patent
Hayami et al.

(12) 
(10) Patent No.: US 6,481,876 B2
(45) Date of Patent: Nov. 19, 2002

(54) LIGHTING SYSTEM FOR VEHICLES

(75) Inventors: Toshihisa Hayami, Shizuoka (JP); Hideki Uchida, Shizuoka (JP)

(73) Assignee: Koito Manufacturing Co., Ltd., Tokyo (JP)

(*) Notice: Subject to any disclaimer, the term of this patent is extended or adjusted under 35 U.S.C. 154(b) by 0 days.

(21) Appl. No.: 09/775,627

(22) Filed: Feb. 5, 2001

(65) Prior Publication Data

US 2001/0012206 A1 Aug. 9, 2001

(30) Foreign Application Priority Data

Feb. 4, 2000 (JP) ........................................ 2000-028037

(51) Int. Cl.[7] ................................................ B60Q 1/00
(52) U.S. Cl. ........................ 362/464; 362/43; 362/276; 362/465; 362/466
(58) Field of Search ................................ 362/464, 465, 362/466, 467, 276, 802, 36, 37, 43; 315/77, 81, 82

(56) References Cited

U.S. PATENT DOCUMENTS

| | | | |
|---|---|---|---|
| 3,855,462 A | 12/1974 | Kondo | |
| 6,254,259 B1 * | 7/2001 | Kobayashi | 340/459 |
| 6,293,686 B1 * | 9/2001 | Hayami et al. | 307/10.8 |
| 6,343,869 B1 * | 2/2002 | Kobayashi | 315/77 |

FOREIGN PATENT DOCUMENTS

| | | | |
|---|---|---|---|
| DE | 36 33 179 A1 | 4/1987 | |
| DE | 197 19 573 A1 | 11/1997 | |
| DE | 196 39 526 A1 | 4/1998 | |
| DE | 198 13 032 A1 | 9/1999 | ............ F21M/3/00 |
| DE | 199 23 187 A1 | 11/2000 | |
| EP | 0 864 462 | 3/1998 | ............ B60Q/1/12 |
| EP | 2 347 996 | 2/2000 | ............ B60Q/1/08 |
| JP | 2000-238576 | 9/2000 | ............ B60Q/1/12 |
| WO | WO 01/01038 | 6/2000 | ............ F21S/8/12 |

\* cited by examiner

*Primary Examiner*—Sandra O'Shea
*Assistant Examiner*—John Anthony Ward
(74) *Attorney, Agent, or Firm*—Sughrue Mion, PLLC

(57) ABSTRACT

A lighting system for vehicles including a plurality of dimmer lamps, a steering sensor, and an electronic control unit (ECU). The dimmer lamps are provided at the front of a vehicle in its moving direction, and their radiated ranges differ from each other and their quantity of light also varies, according to the steering angle as sensed by the steering sensor. The ECU changes the combination of radiated ranges of the lamps to realize light distribution control ahead and sideways of a vehicle by turning-on/off the lamps, as well as changes the quantity of light of each lamp according to the wheel steering angle. The ECU sequentially turns on the lamps according to the steering angle and increases the corresponding quantity of radiation in proportion to the magnitude of the steering angle. Thus, the radiated range gradually expands in the vehicle's turning direction and its brightness gradually increases.

17 Claims, 14 Drawing Sheets

FIG. 4(a)
FIG. 4(b)
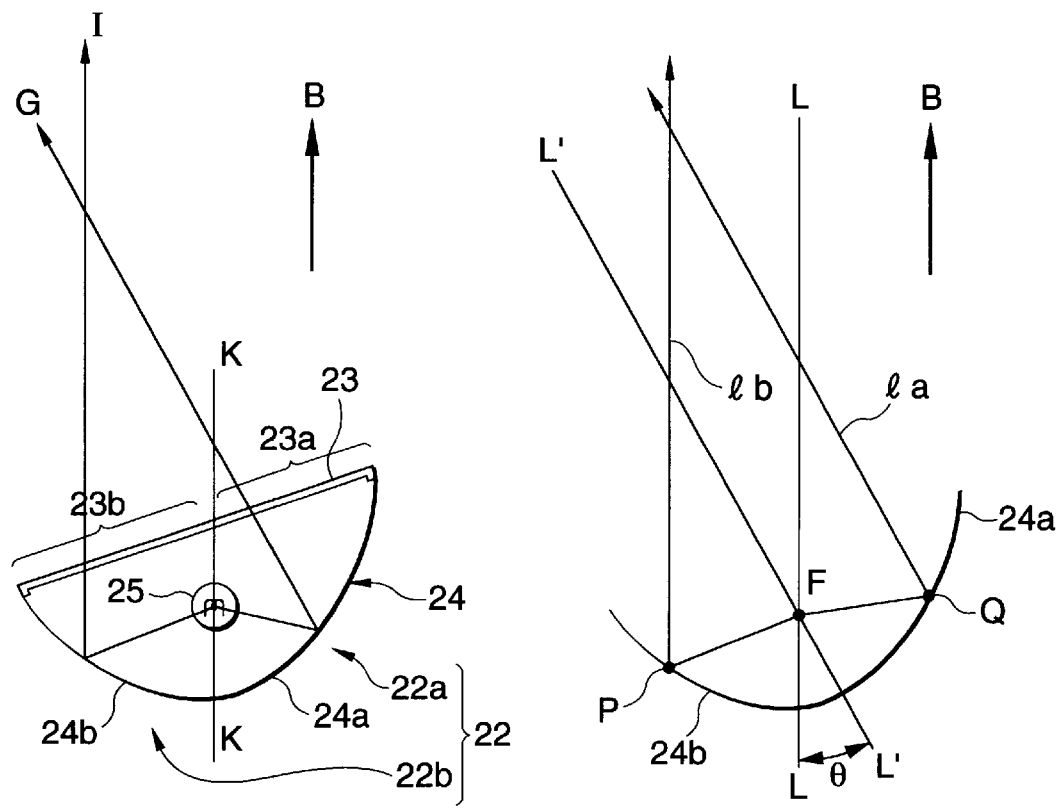
FIG. 4(c)
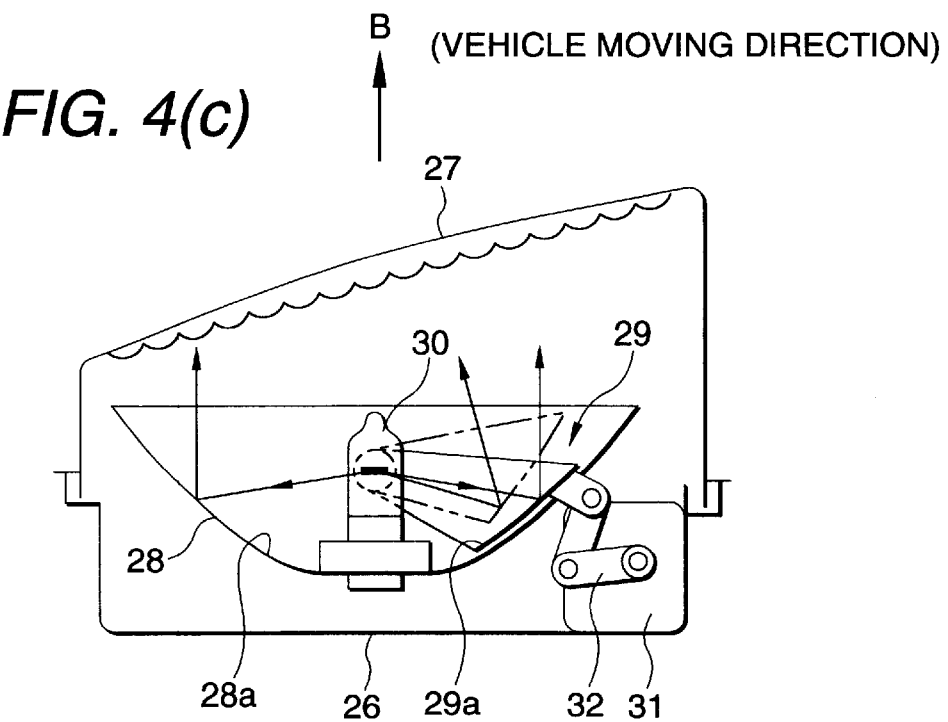
B (VEHICLE MOVING DIRECTION)

(STEERING ANGLE : 0°)

(STEERING ANGLE : VERY SMALL)

(STEERING ANGLE : SMALL)

(STEERING ANGLE : MEDIUM)

(STEERING ANGLE : LARGE)

FIG. 12

CONTROL FOR SUB-BEAM (LOW)

| TURNING ON / TURNING OFF | | STEERING ANGLE 0° → 10°(40°) → 20°(100°) → 60°(180°) / 0° → 10°(30°) → 20°(90°) → 60°(160°) | | | | BAD WEATHER | TURN ON |
|---|---|---|---|---|---|---|---|
| LAMP NAME / DRIVING MODE | HEAD-LAMP (OPTICAL AXIS CONTROL) | CUT-OFF SHAPE | RAIN-LAMP | HEADING-LAMP | CORNERING-LAMP | RAIN-LAMP | CORNERING-LAMP |
| CITY DRIVE 0 ~ 40km/h | FIXING MAIN OPTICAL AXISES OF RIGHT OR LEFT LAMP SHIFTED TO A POSITION 1.5 DEGREES OUTWARD | | ○ | ○ | ○ | ○ (BOTH SIDES) | ○ |
| SUBURBS DRIVE 40 ~ 90km/h | STEERING ANGLE 0° — 7° — 40° / MAIN OPTICAL AXIS POSITION 0° — DEAD ZONE → 0° — 5° | | ○ | ○ | × | ○ (BOTH SIDES) | ○ |
| HIGH-SPEED DRIVE MORE THAN 90km/h | STEERING ANGLE 0° — 5° — 40° / MAIN OPTICAL AXIS POSITION 0° — DEAD ZONE → 0° — 5° | 0.5° UP | ○ | × | × | ○ (BOTH SIDES) | × |

FIG. 13

CONTROL FOR SUB-BEAM (HIGH)

| | | STEERING ANGLE 0° → 10° (40°) → 20° (100°) → 60° (180°) |||| BAD WEATHER | TURN ON |
|---|---|---|---|---|---|---|---|
| | | 0° → 10° (30°) → 20° (90°) → 60° (160°) |||| | |
| TURNING ON / TURNING OFF \ LAMP NAME \ DRIVING MODE | HEAD-LAMP (OPTICAL AXIS CONTROL) | CUT-OFF SHAPE | RAIN-LAMP | HEADING-LAMP | CORNERING-LAMP | RAIN-LAMP | CORNERING-LAMP |
| CITY DRIVE 0 ~ 40km/h | FIXING MAIN OPTICAL AXISES OF RIGHT OR LEFT LAMP SHIFTED TO A POSITION 1.5 DEGREES OUTWARD | 1.5° UP | ○ | ○ | ○ | ○ (BOTH SIDES) | ○ |
| SUBURBS DRIVE 40 ~ 90km/h | STEERING ANGLE  0° — 7° — 40° <br> MAIN OPTICAL AXIS POSITION  0° ← DEAD ZONE → 0° → 5° | 1.5° UP | ○ | ○ | × | ○ (BOTH SIDES) | ○ |
| HIGH-SPEED DRIVE MORE THAN 90km/h | STEERING ANGLE  0° — 5° — 40° <br> MAIN OPTICAL AXIS POSITION  0° ← DEAD ZONE → 0° → 5° | 1.5° UP | ○ | × | × | ○ (BOTH SIDES) | × |

(STEERING ANGLE : SMALL)

(STEERING ANGLE : MEDIUM)

(STEERING ANGLE : LARGE)

LIGHTING SYSTEM FOR VEHICLES

BACKGROUND OF THE INVENTION

1. Technical Field of the Invention

The present invention relates to a lighting system, for vehicles, that specifies turning-on/off and that also specifies the quantity of light of a plurality of dimmer lamps with radiated ranges that are different from each other, wherein the dimmer lamps are provided at the front of a vehicle in its moving direction, and further wherein the lighting system changes the combination of radiated ranges of said lamps to realize light distribution control.

2. Related Art

There is known a lighting system adapted to enhance the safety of driving on a winding road at nighttime by detecting the steering angle of a vehicle and changing the direction of radiation of lamps according to the change in the steering angle.

3. Problems that the Invention is to Solve

However, said related art system only performs control by continuously changing the direction, of part of the radiation, according to the steering angle of a vehicle running on a winding road. Thus, it is difficult to provide sufficient illumination on road signs, pedestrians, the next vehicle ahead, oncoming cars, or obstacles.

Another related art, as the Japanese Patent Laid-Open No. 238576/2000, proposes a lamp apparatus (a lighting system for vehicles) that specifies turning-on and turning-off, and the quantity of light, of a plurality of dimmer lamps with radiated ranges which are different from each other, wherein the dimmer lamps are provided at the front of a vehicle in its moving direction, and further wherein the lamp apparatus changes the combination of radiated ranges of said lamps to realize light distribution control.

However, the lighting system according to the Japanese Patent Laid-Open No. 238576/2000 presented additional problems that a predetermined lamp, generally a lamp on the wheel steering side suddenly comes on during driving on a winding road, thus surprising pedestrians. Also, in such a system, the driver's view suddenly becomes clear in the direction where the vehicle is turning, thus perplexing the driver.

SUMMARY OF THE INVENTION

The invention, made in view of the problems of the above-described related art, aims at providing a lighting system for vehicles that controls the direction and range of radiation by changing the combination of radiated ranges by a plurality of lamps according to the steering angle of a vehicle, wherein the lighting system gradually controls the increase/decrease in the quantity of light in the radiated area by gradually increasing or decreasing the quantity of light of the lamps to turn them on or off.

Manner of Solving the Problems

In the present invention, in order to attain the above and other purposes, a lighting system for vehicles according to a first aspect of the invention includes:

a plurality of dimmer lamps provided at the front of the vehicle in its moving direction, the lamps being disposed on the vehicle so that the radiated range of each of the lamps is adjacent to that of another in one of right and left directions, wherein the quantity of radiation of each lamp is variable;

a steering sensor for detecting the steering angle of the vehicle; and radiation control means for changing the combination of radiated ranges of the lamps to achieve light distribution ahead and sideways of a vehicle by specifying turning-on and turning-off of the plurality of lamps, and also by specifying the quantity of light of each lamp, according to the steering angle as detected by the steering sensor, wherein the radiation control means is adapted to sequentially turn on lamps having respective predetermined radiated ranges ahead, and to the side, of a vehicle according to the steering angle as detected by the steering sensor, and further wherein the radiation control means is adapted to increase and decrease the quantity of radiation of each lamp according to the steering angle.

Relative data on the lamps to turn on, and their quantity of radiation according to the wheel steering angle is preset as tabular data in the radiation means. When the wheel is turned, the radiation control means computes the control data corresponding to the steering angle data provided by the steering sensor and based on said relative data. The radiation control means, based on the computed control data, sequentially turns on lamps having respective predetermined radiated ranges ahead and to the side of a vehicle according to the wheel steering angle.

In this way, lamps having respective predetermined radiated ranges sequentially come on from ahead of a vehicle to the steering direction (the vehicle's turning direction) according to the wheel steering angle to illuminate the vehicle's turning direction. Since the quantity of radiation of the lamps that come on increases according to the steering angle, the brightness of the radiated range in the vehicle's turning direction gradually increases without suddenly increasing, thus preventing the driver from being perplexed.

In a second aspect of the invention, a lighting system for vehicles according to the first aspect of the invention is characterized in that said radiation control means is further adapted to turn on a first one of the plurality of lamps, and then turn on other ones of the plurality of dimmer lamps having adjacent radiated ranges while the first lamp is still on.

Since other lamps having adjacent radiated ranges turn on while the first lamp is on, the radiated range is seamlessly expanded.

In a third aspect of the invention, a lighting system for vehicles according to the first or second aspect of the invention is characterized in that said radiation control means is further adapted to turn on a first one of the plurality of dimmer lamps, and then to sequentially turn on other ones of the plurality of dimmer lamps whose radiated ranges are adjacent from right to left while controlling the quantity of radiation of the first lamp.

Since the quantity of the adjacent radiated ranges increases as the quantity of light in the radiated range of the first lamp increases, the radiated range corresponding to the area ahead of a vehicle in its moving direction is seamlessly expanded in either right or left directions while gradually increasing in brightness.

In a fourth aspect of the invention, a lighting system for vehicles according to either the first or second aspects of the invention is characterized in that said radiation control means is further adapted to turn on a first one of said plurality of dimmer lamps, and then to sequentially turn on other ones of said plurality of dimmer lamps whose radiated ranges are adjacent from right to left, about at the same time as the quantity of radiation of the first lamp is set to a maximum.

Since the quantity of light of other lamps whose radiated ranges are adjacent from right to left increases about at the same time as the quantity of radiation of the first lamp reaches the maximum, the radiated range corresponding to the area ahead of a vehicle in its moving direction is seamlessly expanded in either right or left directions while gradually increasing in brightness.

In a fifth aspect of the invention, a lighting system for vehicles according to any of the first through fourth aspects of the invention is characterized in that said radiation control means is further adapted to turn on each of the plurality of dimmer lamps at respective predetermined steering angles, to increase the quantity of radiation of each lamp as the steering angle increases, and to maintain, once the quantity of radiation of the lamp has reached a predetermined value, the quantity of radiation of the lamp at the predetermined value irrespective of an increase in the steering angle.

The more the wheel is turned (i.e., the greater the steering angle), the radiated range ahead of the steering direction becomes brighter and is maintained at a substantially constant quantity of radiation until the wheel is returned to a predetermined steering angle position. This makes it easier to detect pedestrians or obstacles.

In a sixth aspect of the invention, a lighting system for vehicles according to any of the first through fourth aspects of the invention is characterized in that said radiation control means is further adapted to turn on each of the plurality of dimmer lamps at respective predetermined steering angles, to increase the quantity of radiation of each lamp as the steering angle increases, and to lower, once the quantity of radiation of the lamp has reached a predetermined value, the quantity of radiation of the lamp according to an increase in the steering angle.

Since the quantity of radiation of a lamp having the radiated range in the direction corresponding to the wheel steering angle (ahead of a vehicle in its moving direction) is at the maximum and other lamps have small radiated ranges, the area in the vehicle's turning direction is the brightest thus providing excellent visibility and reducing power consumption.

In a seventh aspect of the invention, a lighting system for vehicles according to any of the first through sixth aspects of the invention comprises a vehicle speed sensor that detects the speed of the vehicle, characterized in that said radiation control means is further adapted to control the quantity of radiation of said plurality of dimmer lamps according to the vehicle speed by controlling the quantity of radiation of said plurality of dimmer lamps so that the quantity of radiation of the radiated area ahead of a vehicle becomes smaller and the quantity of radiation of the radiated area sideways of the vehicle becomes larger as the vehicle speed becomes lower, and by controlling the quantity of radiation of the plurality of dimmer lamps so that the quantity of radiation of the radiated area ahead of a vehicle becomes larger and the quantity of radiation of the radiated area sideways of the vehicle becomes smaller as the vehicle speed becomes higher.

In case control of the radiated area is made according to the wheel steering angle without varying the quantity of radiation of lamps, the driver senses a smaller dispersion of light responsive to wheel steering when the vehicle speed is low. On the other hand, the driver senses a larger dispersion of light responsive to wheel steering when the vehicle speed is high. This phenomenon is generally caused because the driver's field of view is wider at a lower vehicle speed and is narrower at a higher vehicle speed.

However, by controlling the quantity of radiation of dimmer lamps so that the quantity of radiation of the radiated area ahead of a vehicle becomes smaller and the quantity of radiation of the radiated area sideways of the vehicle becomes larger as the vehicle speed becomes lower, and by controlling the quantity of radiation of the dimmer lamps so that the quantity of radiation of the radiated area ahead of a vehicle becomes larger and the quantity of radiation of the radiated area sideways of the vehicle becomes smaller as the vehicle speed becomes higher, the driver senses a constant dispersion of light responsive to wheel steering irrespective of the vehicle speed. Thus, a difference in sensing of dispersion of light responsive to wheel steering, caused by a difference in the vehicle speed, is canceled.

In an eighth aspect of the invention, a lighting system for vehicles according to any of the first through seventh aspects of the invention further comprises an illumination control mode selector switch for selecting, by a plurality of stages, one of a plurality of levels of quantity of radiation of all of said plurality of dimmer lamps, wherein said radiation control means is further adapted to control the quantity of radiation of the plurality of dimmer lamps based on the illumination control mode selected via said illumination control mode selector switch.

For example, it is possible to select the illumination control ratio of each lamp between three illumination control modes, a high illumination control mode whose maximum output is 100 percent, a medium illumination control mode whose maximum output is 80 percent, and a low illumination control mode whose maximum output is 60 percent. The driver selects the low illumination control mode when driving in a very bright place where city lights are numerous, the high illumination control mode when driving in a very dark place such as a mountain road, and the medium illumination control mode when driving on a road having medium brightness. Thus, it is possible to control the quantity of radiation of lamps based on a proper illumination control mode where the quantity of radiation is not wasted.

In a ninth aspect of the invention, a lighting system for vehicles according to any of the first through eighth aspects of the invention, further comprises a turn signal lamp switch, and is characterized in that said radiation control means is further adapted to control the quantity of radiation of a predetermined one of the plurality of dimmer lamps to provide the maximum quantity of radiation of said one lamp when the turn signal lamp switch is turned ON, irrespective of the wheel steering angle.

The turn signal lamp switch is turned on some time, not immediately, before the vehicle makes a turn. In connection with the turn signal lamp switch being turned ON, the quantity of radiation of a predetermined lamp (a lamp that illuminates a predetermined radiated range ahead in the vehicle's turning direction) reaches the maximum before wheel steering irrespective of the wheel steering angle, thus brightly illuminating the area ahead of a vehicle in its turning direction.

In a tenth aspect of the invention, a lighting system for vehicles according to any of the first through ninth aspects of the invention is characterized in that said lighting system for vehicles further comprises variable optical axis lamps whose optical axes vary in right and left directions in connection with the wheel steering angle.

By additionally using variable optical axis lamps whose optical axes vary in connection with the wheel steering angle, a more proper light distribution control during driving is achieved.

That is, using only variable optical axis lamps may result in light distribution being interrupted by a mechanical driver that drives the optical axis right and left, thus limiting the range of light distribution control. On the other hand, using only a structure where a plurality of dimmer lamps are sequentially turned on via illumination control, said lamps having radiating ranges adjacent to each other and said structure adapted to vary the quantity of radiation of the lamps, does not provide a seamless variation in light distribution. Thus, by combining both approaches (variable optical axis lamps and a plurality of dimmer lamps), it is possible to realize a desirable predetermined light distribution in terms of driving as well as to vary light distribution seamlessly.

In an eleventh aspect of the invention, a lighting system for vehicles according to the tenth aspect of the invention is characterized in that said variable optical axis lamps are composed of headlamps mainly radiating the area ahead of a vehicle, and in that said dimmer lamps are composed of auxiliary lamps for illuminating the areas ahead of and around a vehicle, wherein the auxiliary lamps include: sub lamps for mainly radiating white lines on a road or shoulders; sideways radiating lamps having a radiated range from diagonally ahead to sideways of a vehicle; and lamps for radiating the area in the diagonally forward direction having a radiated range located between that of said sub lamps and that of said sideways radiating lamps.

The optical axis of a headlamp (radiated range) varies in right and left directions in connection with the wheel steering angle, auxiliary lamps having radiated ranges corresponding to the steering direction (vehicle's turning direction) sequentially come on, and the quantity of radiation of the auxiliary lamps that come on gradually increases according to the steering angle. Thus, the area ahead of a vehicle in its moving direction (vehicle's turning direction) is illuminated brightly and the brightness of the quantity of radiation in the vehicle's turning direction does not vary suddenly. This approach is thus less perplexing to the driver.

BRIEF DESCRIPTION OF THE DRAWINGS

The above and other objects and advantages of the present invention will become more apparent by describing in detail preferred exemplary embodiments thereof with reference to the accompanying drawings, wherein like reference numerals designate like or corresponding parts throughout the several views, and wherein:

FIGS. 4(a), (b), and (c) are horizontal sectional views showing configurations of the auxiliary lamps (dimmer lamps);

FIG. 12 is a chart for explaining a control example of headlamps and auxiliary lamps used with low beams of headlamps;

FIG. 13 is a chart for explaining a control example of headlamps and auxiliary lamps used with high beams of headlamps;

DETAILED DESCRIPTION OF THE PREFERRED EMBODIMENTS

Figure 1:
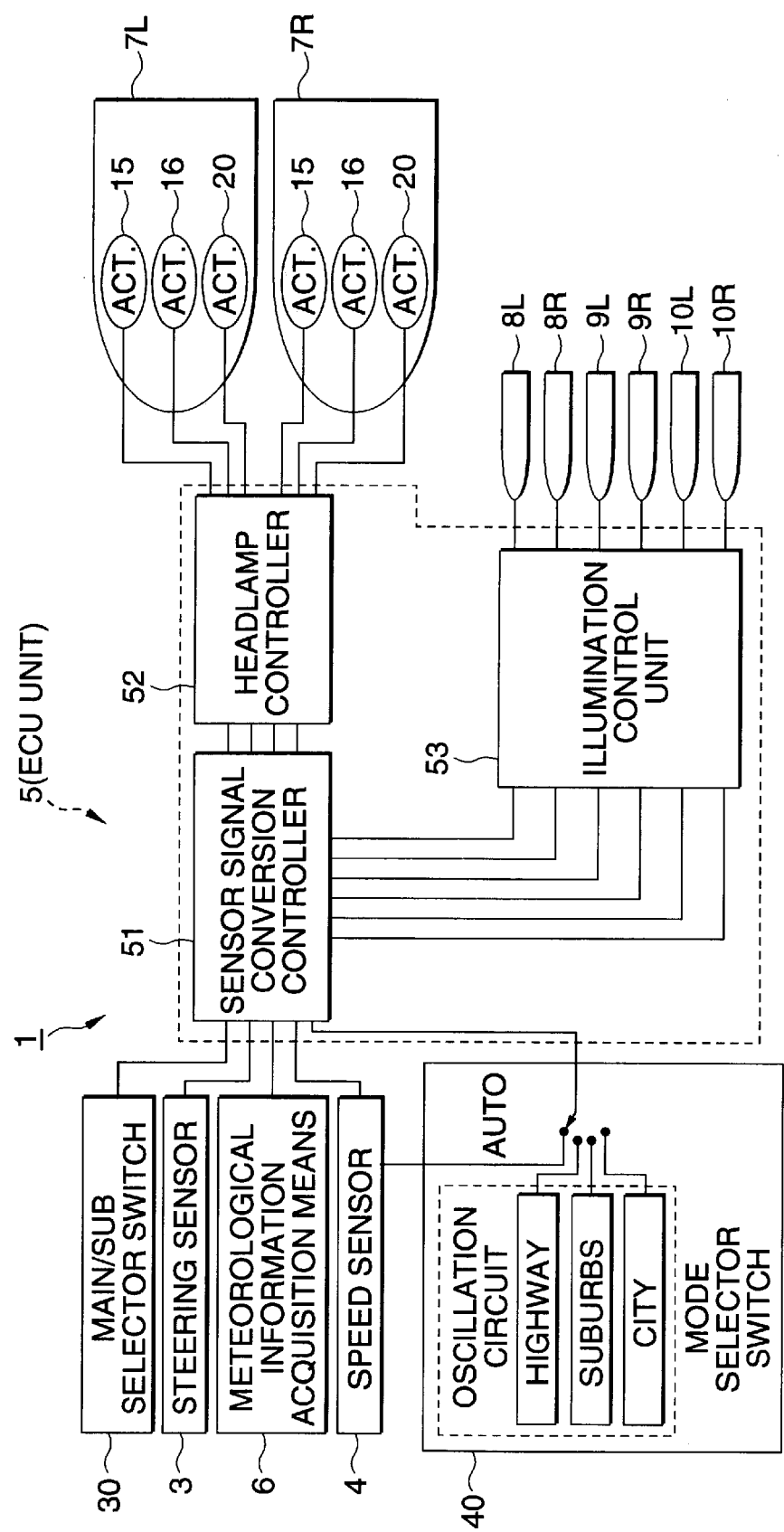
FIG. 1 is a block diagram showing the basic configuration of a lighting system for vehicles according to a first embodiment of the invention.
Figure 2:
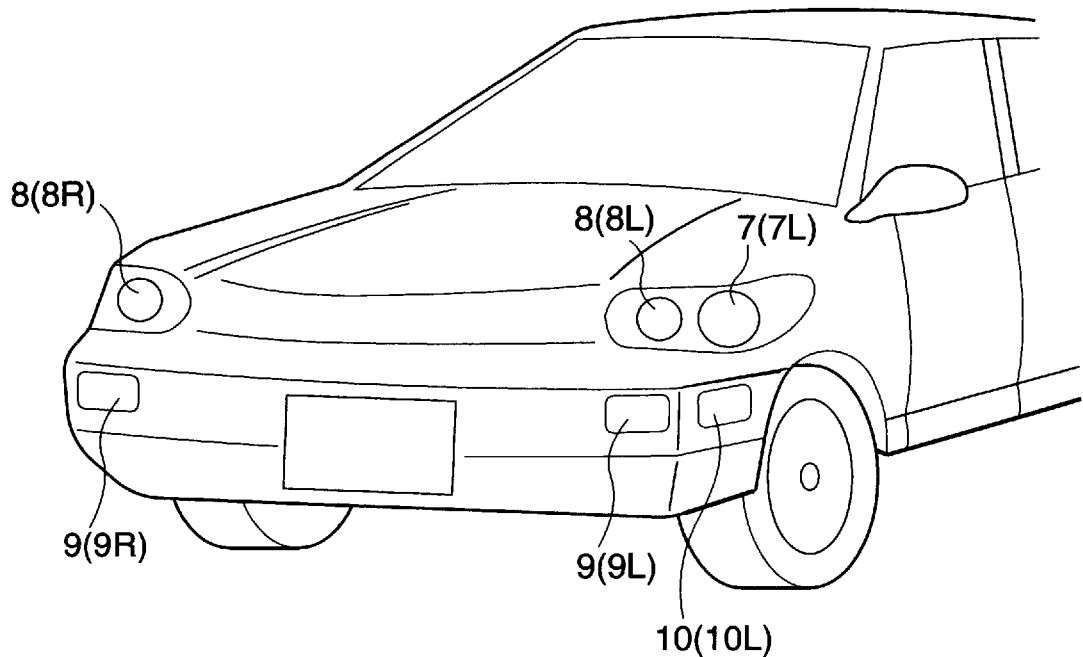
FIG. 2 is a perspective view showing the arrangement of headlamps and auxiliary lamps (dimmer lamps) provided at the front of an automobile.
Figure 3:
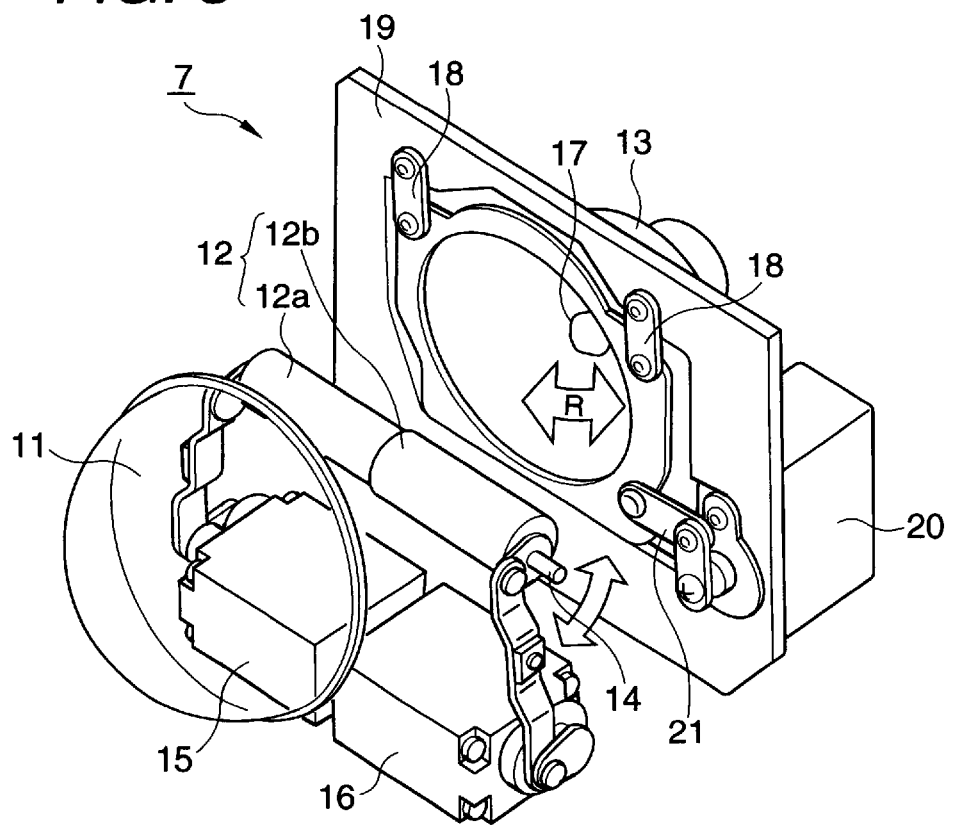
FIG. 3 is perspective view showing a configuration of the headlamps.
Figure 5:
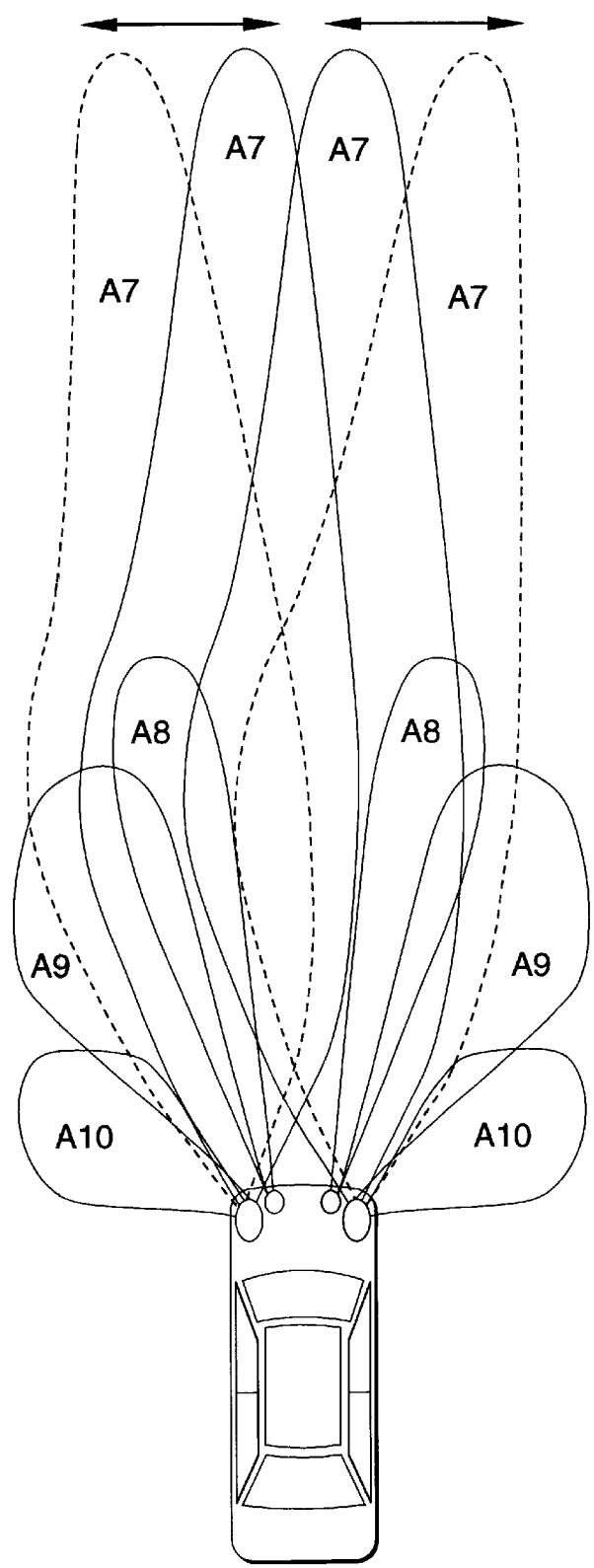
FIG. 5 is a schematic diagram showing the radiated ranges of headlamps and auxiliary lamps as seen from above a vehicle.
Figure 6:
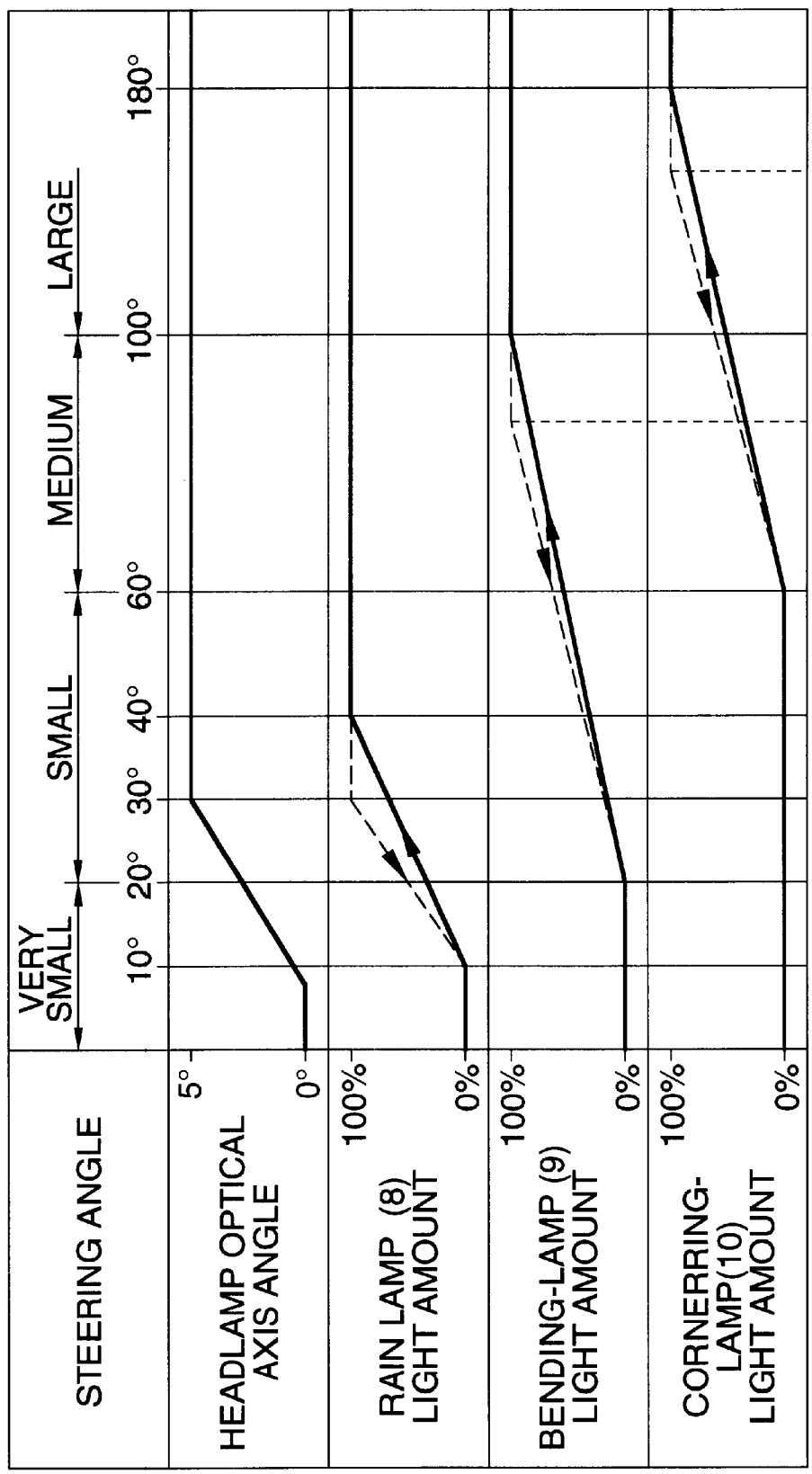
FIG. 6 is a diagram showing the relationship between the headlamps' optical axes angles to the steering angle, and the quantity of light of each dimmer lamp.
Figure 7:
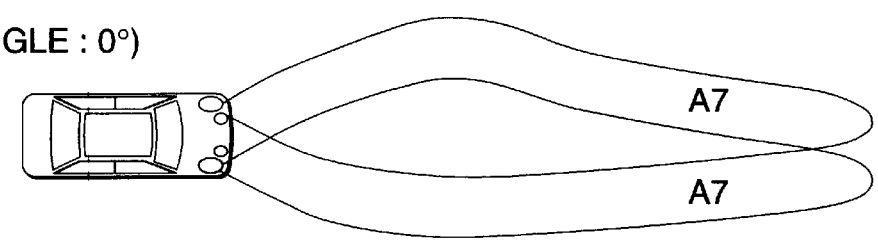
FIG. 7 is a schematic diagram showing the radiated ranges of headlamps and auxiliary lamps as seen from above a vehicle (where steering angle is 0)
Figure 8:
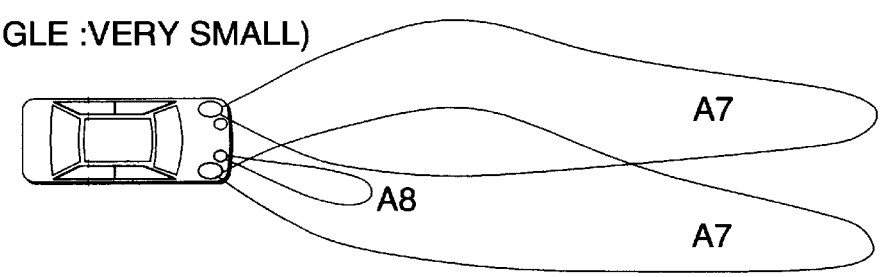
FIG. 8 is a schematic diagram showing the radiated ranges of headlamps and auxiliary lamps as seen from above a vehicle (where steering angle is very small)
Figure 9:
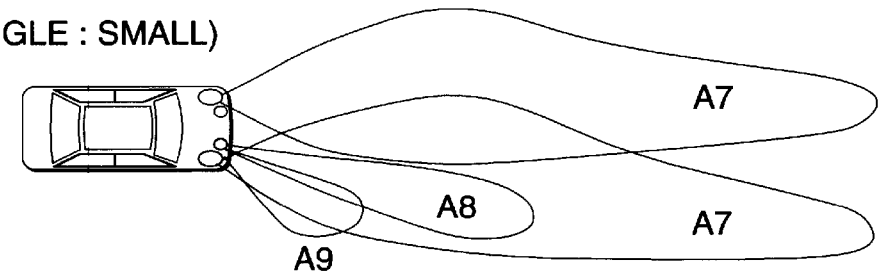
FIG. 9 is a schematic diagram showing the radiated ranges of headlamps and auxiliary lamps as seen from above a vehicle (where steering angle is small)
Figure 10:
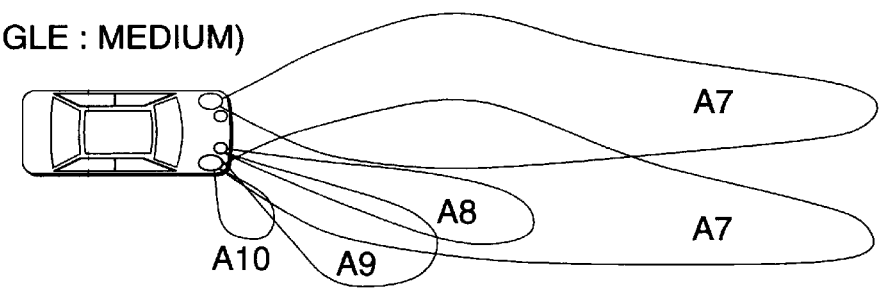
FIG. 10 is a schematic diagram showing the radiated ranges of headlamps and auxiliary lamps as seen from above a vehicle (where steering angle is medium)
Figure 11:
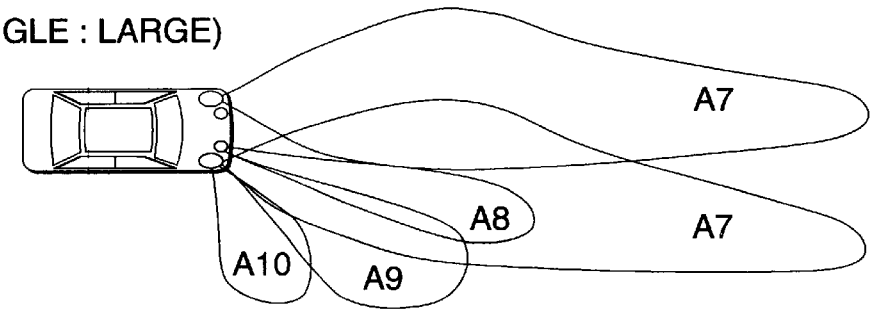
FIG. 11 is a schematic diagram showing the radiated ranges of headlamps and dimmer lamps as seen from above a vehicle (where steering angle is large)
Figure 14:
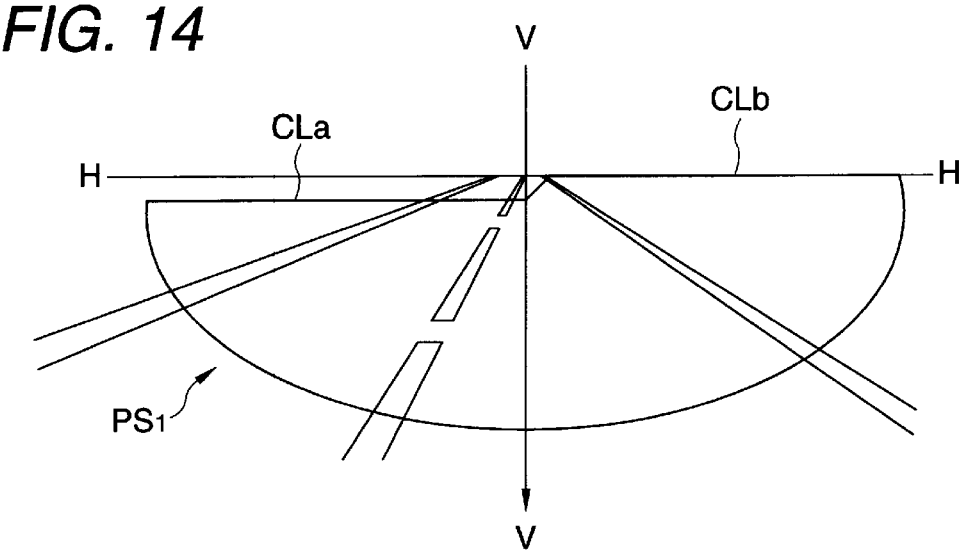
FIG. 14 shows a light distribution pattern for low beams of headlamps.
Figure 15:
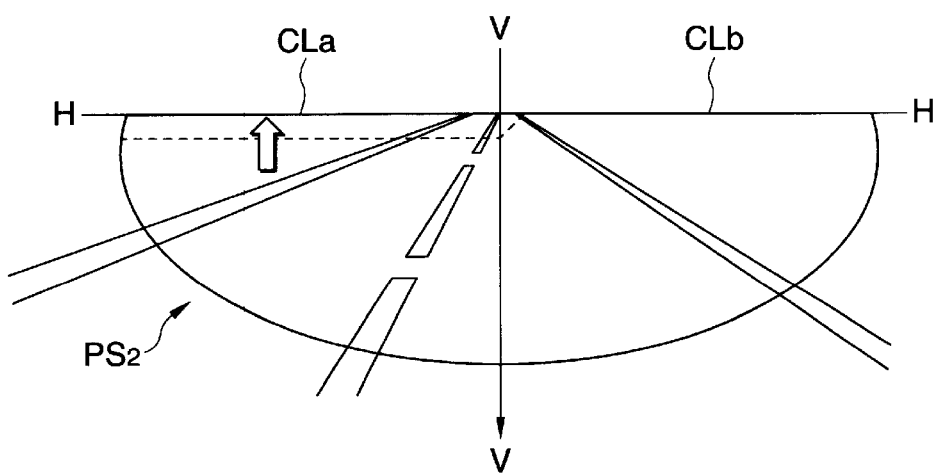
FIG. 15 shows a light distribution pattern for low beams of headlamps.
Figure 16:
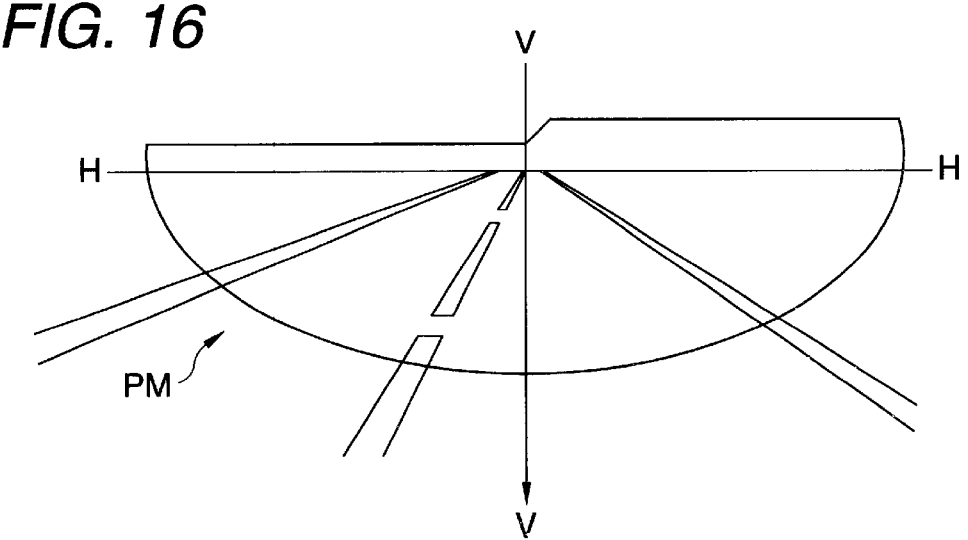
FIG. 16 shows a light distribution pattern for high beams of headlamps.

Next, embodiments of the invention will be explained based on examples. FIGS. 1 through 16 show a lighting system for vehicles (automobiles) as a first embodiment of the invention. FIG. 1 is a block diagram showing the basic configuration of a lighting system for vehicles. FIG. 2 is a perspective view showing the arrangement of headlamps and auxiliary lamps (dimmer lamps) provided at the front of an automobile. FIG. 3 is perspective view showing the configuration of headlamps. FIG. 4 is a horizontal sectional view showing the configuration of auxiliary lamps (dimmer lamps). FIG. 5 is a schematic diagram showing the radiated ranges of headlamps and auxiliary lamps as seen from above a vehicle. FIG. 6 is a diagram showing the relationship between the optical axis angles of the headlamps to the steering angle and the quantity of light of each dimmer lamp. FIGS. 7 through 11 are schematic diagrams showing the radiated ranges of headlamps and auxiliary lamps as seen from above a vehicle. FIG. 7 assumes a steering angle of 0 degrees. FIG. 8 assumes a very small steering angle. FIG. 9 assumes a small steering angle. FIG. 10 assumes a medium steering angle. FIG. 11 assumes a large steering angle. FIGS. 12 and 13 are charts for explaining control examples of headlamps and auxiliary lamps. FIG. 12 shows a control example used when low beams of headlamps are formed. FIG. 13 shows a control example used when high beams of headlamps are formed. FIGS. 14 and 15 show light distribution patterns for low beams of headlamps. FIG. 16 shows light distribution patterns for high beams of headlamps.

A lighting system for automobiles 1 is mainly composed of headlamps (7L, 7R) provided at the front of a vehicle, auxiliary lamps 8 (8L, 8R), 9 (8L, 9R), 10 (10L, 10R), a steering sensor 3 for detecting the steering angle, a vehicle speed sensor 4 for detecting the vehicle speed, a main/sub selector switch 30 for switching between the main and sub light distribution of headlamps, a radiation control mode selector switch 40 for switching between radiation states of headlamps 7 and auxiliary lamps 8, 9, 10 according to the driving situation (city driving, suburban driving, high-speed driving), and an ECU unit (electronic control unit with built-in CPU) 5. The ECU acts as radiation control means for controlling light distribution of each lamp 7, 8, 9, 10, based on the information provided by the steering sensor 3, the vehicle speed sensor 4, the main/sub selector switch 30, and the radiation control mode selector switch 40.

Arrangement of the lamps is shown in FIG. 2. Headlamps 7 are arranged slightly sideways. Rain lamps 8 are arranged at positions forward of the headlamps 7. Below the rain lamps 8 are arranged bending lamps 9. Below the headlamps 7, sideways of a vehicle are arranged cornering lamps 10.

The Role of each lamp will now be explained. Headlamps 7 mainly illuminate the area ahead of a vehicle in its moving direction, and play a main role in light distribution of low beams and high beams. Rain lamps 8 are auxiliary lamps for mainly illuminating white lines on a road or shoulders, and serve in cornering illumination and rainy weather illumination. Bending lamps 9 are cornering diagonal illumination lamps used for low speeds at crossings for illuminating the area from ahead, and diagonally ahead, to sideways of the vehicle front. Headlamps 7 are adapted to allow variable control of light distribution by shifting the optical axis in up, down, right, and left directions to change the radiation direction. Auxiliary lamps 8, 9, 10 are composed of dimmer lamps having radiated ranges adjacent to each other, wherein the radiation direction of each lamp is fixed but the quantity of radiation can be increased or decreased.

FIG. 3 shows a specific exemplary configuration of a headlamp 7 that is a projector-type lamp comprising a projection lens 11, a shade 12 and a reflecting mirror 13.

The headlamp (projector-type) comprises a drive mechanism for changing the position of the shade 12 and the reflecting mirror 13. Via this configuration, the headlamp is adapted to change the height (upper limit) of light distribution patterns and shift the optical axis clockwise and counterclockwise (see FIGS. 13, 14, 15).

That is, as shown in FIG. 3, the shade 12 includes a column 12a that specifies the upper limit of height on the vehicle's lane in light distribution patterns, and also includes a column 12b that specifies the upper limit of height on the oncoming vehicle's lane in light distribution patterns. By rotating via actuators 15, 16 eccentric rotation axes 14, 14 (one of them is shown) protruded sideways at a position eccentric to the center axis of each column, the height of each column is specified. It should be noted that the light distribution pattern is projected as an inverted image of the shade 12.

A light source 17 is attached to the reflecting mirror 13. The light emitting section of the light source 17 is positioned on the optical axis of the reflecting mirror in the concave section of the reflecting mirror 13. The reflecting mirror 13 is a reflecting mirror having, for example, a reflecting face such as an elliptic paraboloid or spheroid of revolution.

The drive mechanism of the reflecting mirror 13 has a configuration wherein a section near the upper end of the reflecting mirror 13 is attached to a supporting member 19 of the reflecting mirror 13 via parallel links 18, 18. The reflecting mirror is then rotated in the direction shown by an arrow R in FIG. 3 via an L-shaped rotary link 21 bridged from an actuator 20, fixed to the supporting member 19, to the periphery of the reflecting mirror 13. With this configuration, by shifting the optical axis of the reflecting mirror 13, it is possible to direct the direction of radiation in a desired direction (see the area shown by a sign A7 in FIG. 5).

FIG. 4 shows the configuration of an auxiliary lamp (rain lamp 8, bending lamp 9, cornering lamp 10). The auxiliary lamp has a general configuration as a lamp for automobiles, that is, it includes a lens, a reflecting mirror, and a light source. Although an auxiliary lamp 8, 9, or 10 is not provided with a light distribution (optical axis) control feature, the lamp includes a dimmer lamp that can control the quantity of radiation by controlling turning-on and turning-off as well as the quantity of light emission from the light source.

That is, referring to an auxiliary lamp (rain lamp 8, bending lamp 9, cornering lamp 10) in a configuration shown in FIG. 4(a), a radiation section 22a is composed of a lens section 23a and a reflecting section 24a. By cooperation of these sections, light from a light source 25 is radiated in the direction diagonally leftward in the forward direction to the moving direction of the vehicle "B", as shown by an arrow G in the figure. A radiation section 22b is composed of a lens section 23b and a reflecting section 24b. By cooperation of these sections, light from a light source 25 is radiated in the direction substantially parallel to the moving direction of the vehicle, as shown by the arrow I in FIG. 4a. It is clear that light distribution may be determined by an optical action made via cooperation of a lens step attached to the lens and a reflecting mirror. Alternatively, almost all of the light distribution may be specified only via design of the shape of the reflecting mirror, with a slight lens step formed on a lens, the lens being plain or almost plain. Control of the quantity of emission at the light source is made by controlling a current, a voltage, or a supply power to the light source 25, which increases or decreases the quantity of radiation by the lamps.

The auxiliary lamps 8, 9, 10 may have a configuration as shown in FIG. 4(b) or (c). In FIG. 4(b), the shape of the reflecting section 24b is a paraboloid of revolution and the optical axis "L—L", which is an axis of rotational symmetry thereof, is specified to extend in the vehicle's moving direction "B" (see the light ray "1b" at the point P). The other reflecting section 24a has a configuration where the shape of the reflecting section 24a is a paraboloid of revolution and the optical axis "L'—L'", which is an axis of rotational symmetry thereof, is slanted by a degree θ against the above optical axis L—L (see the light ray "1a" at the point Q).

As shown in FIG. 4(c), a configuration is possible where part of a reflecting mirror is rotated about a predetermined axis to direct the optical axis of the reflecting section in a desired direction.

That is, in the lamp space defined by a lamp body 26 and a lens 27 that covers the front opening of the lamp body 26, there is provided a fixed reflecting mirror 28. Inside the fixed reflecting mirror 28 is attached a movable reflecting mirror 29, whose rotation center axis is set to an axis that passes through the center of emission of the light source 30 in perpendicular direction to the space in the figure. A mechanism is provided for rotating the movable reflecting mirror 29 via a link member 32 and an actuator 31 arranged in the lamp body 26. Thus, it is possible to obtain different light distribution between a state shown by the solid line in FIG. 4(c) and another state as shown by the dashed line in FIG. 4(c). In the distribution as shown by the solid line in FIG. 4(c), each optical axis is in the forward direction of a vehicle—moving direction shown by an arrow B—for both the reflecting face 28a of the fixed reflecting mirror 28 and the reflecting face 29a of the movable reflecting mirror 29. In the distribution as shown by the dashed line in FIG. 4(c), the movable reflecting mirror 29 is rotated by a predetermined angle by the actuator 31 so that the optical axis direction of the reflecting face 29a is specified in a direction slanted against the moving direction B.

For each of the rain lamp 8, bending lamp 9, and cornering lamp 10, the optical axis (radiation direction) is fixed to a state slanted against the vehicle's moving direction B. The slant of the optical axis of each lamp against the vehicle's moving direction B differs from lamp to lamp, so that the radiated ranges of the lamps 8, 9, 10 (radiated range of the rain lamp 8 is shown by A8, radiated range of the bending lamp 9a is shown by A9, and radiated range of the cornering lamp 10 is shown by A10) are adjacent to each other in right and left directions (see FIG. 5).

The ECU unit 5, acting as radiation control means, changes the combination of radiated ranges of lamps 7, 8, 9, 10 and the quantity of light of auxiliary lamps 8, 9, 10 to perform light distribution control ahead and sideways of a vehicle, by specifying the position in the up, down, right and left directions of the headlamp 7, as well as by turning-on/off of and controlling the quantity of radiation of auxiliary lamps 8, 9, 10, according to the information provided by the main/sub selector switch 30, the steering sensor 3, the vehicle speed sensor 4, and the radiation control mode selector switch 40. For this purpose, the ECU unit 5 sends a control signal for varying light distribution to the headlamp 7, sends signals to the auxiliary lamps 8, 9, 10 for turning on/off each of the auxiliary lamps 8, 9, 10, and sends a control signal on the quantity of radiation of a lamp in case the lamp is to be turned on.

The ECU unit 5 is composed of a sensor signal conversion controller 51, a headlamp controller 52, and an illumination control unit 53, as shown in FIG. 1.

The sensor signal conversion controller 51 comprises a CPU as a controller and a storage. In the storage is preset, in a table, light distribution control data for headlamps and for auxiliary lamps. The light distribution control data for headlamps includes such data as relative data on the optical axis position of headlamps to the wheel steering angle (amount of steering) and cut lines of light distribution patterns. The light distribution control data for auxiliary lamps includes such data as relative data on the auxiliary lamps to turn on and the quantity of radiation corresponding to the wheel steering angle (amount of steering).

The sensor signal conversion controller 51, in response to a signal input from the main/sub selector switch 30, the steering sensor 3, the vehicle speed sensor 4, and the radiation control mode selector switch 40, computes light distribution control data for headlamps and light distribution control data for auxiliary lamps based on the relative data. The sensor signal conversion controller 50 then outputs a control signal, corresponding to such control data thus computed, to the headlamp controller 52 and the illumination control unit 53.

The headlamp controller 52, based on the control signal from the sensor signal conversion controller 51, sends a drive control signal for variably controlling the light distribution of headlamps to the actuators 15, 16, 20 built into the headlamps. The illumination control unit 53 sends a signal for controlling illumination (quantity of radiation) and turning-on/off of the auxiliary lamps 8, 9, 10.

For example, as the vehicle speed detected by the vehicle speed sensor 4 becomes higher, the ECU unit performs light distribution to decrease the number of auxiliary lamps 8, 9, 10 that are turned on in order to make narrower the radiated range. This prevents the radiated range ahead of a vehicle in its moving direction from being shifted to right and left to a great extent even when the steering angle is changed during high-speed driving. Such an approach stabilizes the light distribution thus preventing users of roads (such as drivers in other vehicles) from being surprised or being dazzled by glare.

When straight driving of the vehicle is detected by the steering sensor 3, the auxiliary lamps 8, 9, 10 are not turned on, but only the headlamps 7 are turned on.

When a change in the steering angle is detected by the steering sensor 3, the auxiliary lamps 8, 9, 10 are sequentially turned on so that the vehicle's turning direction may be more widely illuminated. In this practice, the ECU unit 5 turns on or off the auxiliary lamps 8, 9, 10 by stages. Via this configuration, in right and left turns and driving on a winding road, it is possible to provide radiation over a wide range including the vehicle's turning direction as well as the target direction, thus securing the driver's forward field of view.

The ECU unit 5 controls the current, voltage or supply power to the light sources of lamps 8, 9, 10 so as to increase the quantity of radiation of the auxiliary lamps 8, 9, 10 so that they can be sequentially turned on. Via this configuration, the radiated range according to the steering angle becomes gradually brighter thus preventing the driver from being perplexed or pedestrians from being surprised by sudden illumination.

The driving environment of an automobile changes in various ways such as, for example, the time and place where the automobile is being driven, the meteorological situation, etc. Therefore, a meteorological information acquisition means 6 is provided for grasping the weather around a vehicle (see FIG. 1). In case a signal from the meteorological information acquisition means 6 is received by the ECU unit 5, and the signal indicates worsening weather is expected, the rain lamps 8 for mainly illuminating white lines on roads or shoulders are preferably turned on. This is to prevent white lines on roads (center lines or lane marks on shoulders) from being harder to recognize in a bad weather such as rainy whether, cloudy weather or snowfalls.

The meteorological situation is either directly detected, or is assumed based on indirect information. The former method includes a judgment made after considering image processing that is based on the information from a front shooting camera, and data collected from a variety of sensors that are provided to detect rain drops, temperature, humidity, and ambient illuminance. The latter method includes, for example, collecting information on apparatus that is operated according to a change in weather conditions, such information including a signal indicating the wiper operation state. Also, acquisition of meteorological information can be made via road-to-vehicle communications (use of a facility that links a vehicle to a road via radio communications) or FM multiple access communications.

FIG. 5 is a schematic diagram of the radiated ranges of the lamps 7, 8, 9, 10 of a vehicle as seen from above.

Areas A7, A7 shown in FIG. 5 respectively show the radiated ranges via right and left headlamps 7 (7L, 7R). For the headlamp 7, it is possible to shift the optical axis over a predetermined angle range, for example from −5 degrees (left) to +5 degrees (right) in the horizontal direction (see the arrow in FIG. 5) in connection with a change in the steering angle that accompanies a steering operation. As shown by an area of broken lines in FIG. 5, the optical axis can be shifted clockwise for the headlamp 7R on the right side at the front of the vehicle, and counterclockwise for the headlamp 7L on the left at the front of the vehicle.

Areas A8, A8 respectively show the radiated ranges of the left and right rain lamps 8 (8L, 8R). The rain lamps 8 illuminate the road surface positioned closer to the vehicle than does the area illuminated by the headlamps 7. That is, rain lamps 8 illuminate a white line some 20 meters ahead of the vehicle. In case road traffic regulations make it an obligation to drive on the right lane, the rain lamp 8 (8R) on the right side at the front of the vehicle can illuminate the white line on the shoulder and the rain lamp 8 (8L) on the left side at the front of the vehicle can illuminate the center line under conditions that oncoming vehicles are not annoyed by a dazzling light caused by glare.

Areas A10, A10 respectively show the radiated ranges of the left and right cornering lamps 10 (10L, 10R). the areas A10,A10 cover the areas from the diagonally forward direction (some 45 degrees to the moving direction) to sideways (some 90 degrees to the moving direction).

Areas A9, A9 respectively show the radiated ranges of the left and right bending lamps 9 (9L, 9R). The areas A9,A9 cover the areas positioned between the areas A8 and areas A10.

It is thus understood that turning on all these lamps 7, 8, 9, 10 provides radiation over a considerably wide range ahead of a vehicle.

FIG. 6 shows the relationship between the optical axis angle of the headlamp 7 and the quantity of radiation of the auxiliary lamps 8, 9, 10 (control example of the optical axis of headlamps and turning-on of auxiliary lamps via illumination control). FIGS. 7 through 11 show the radiated ranges of the headlamp 7 and the auxiliary lamps 8, 9, 10 assumed when the wheel is turned clockwise.

Optical axis control of the headlamp 7 is made so that the optical axis of the headlamp 7 is parallel with the vehicle axis as shown in FIG. 7. When the wheel is turned clockwise, the optical axis of the headlamp 7R in the steering direction (clockwise) increases until the steering angle reaches 30 degrees with an increase in the wheel steering angle. Once the steering angle reaches 30 degrees (optical axis angle of +5 degrees), the optical axis angle of the headlamp 7R on the right side is maintained at +5 degrees irrespective of an increase in the steering angle.

The auxiliary lamps 8, 9, 10 come on when a predetermined steering angle is reached. The quantity of radiation of these lamps increase with an increase in the steering angle. Conditions for tuning on the auxiliary lamps 8, 9, 10 for a steering angle differ from each other as shown in FIG. 6.

The rain lamp 8 comes on via illumination control at a steering angle of 10 degrees or above. The bending lamp 9 comes on via illumination control at a steering angle of 20 degrees or above. The cornering lamp 10 comes on via illumination control at a steering angle of 60 degrees or above. Thus, when the steering angle is very small (less than 10 degrees), none of the lamp 8, 9, or 10 comes on. When the steering angle exceeds 10 degrees, the lamp 8R comes on first. When the wheel is then turned further to exceed a steering angle of 20 degrees, the lamp 9R comes on. And when the wheel is turned still further to exceed a steering angle of 60 degrees, the lamp 10R comes on.

Also, the quantity of radiation of the lamps 8R, 9R, 10R gradually increases with an increase in the steering angle. The quantity of radiation reaches the maximum at a steering angle of 40 degrees for the lamp 8R, at a steering angle of 100 degrees for the lamp 9R, and at a steering angle of 180 degrees for the lamp 10R. In this way, the ratio of increase in the quantity of radiation differs between lamps. Once reaching the maximum, the quantity of radiation of each of the lamps 8R, 9R, 10R is maintained at the maximum irrespective of an increase in the steering angle.

FIG. 8 shows a case where the steering angle is very small (within the range of 10 to 20 degrees). As shown in FIG. 6, the optical axis of the headlamp is shifted in the steering direction (clockwise) by the amount corresponding to the steering angle (about 0 to 3 degrees) thus causing the lamp 8R to come on, with the quantity of radiation being a relatively small 0 to 30 percent.

FIG. 9 shows a case where the steering angle is small (within the range of 20 to 60 degrees). The optical axis of the headlamp is shifted clockwise by the amount corresponding to the steering angle (3 to 5 degrees) but is fixed to +5 degrees for a steering angle of 30 degrees or above. On the other hand, the quantity of radiation of the lamp 8R that is illuminating gradually increases with an increase in the steering angle, reaching the maximum (100 percent) at a steering angle of 40 degrees. Afterwards, the quantity of radiation by lamp 8R is maintained at the maximum irrespective of an increase in the steering angle. The lamp 9R comes on at a steering angle of 20 degrees and the quantity of radiation gradually increases with an increase in the steering angle, the range being a relatively small 0 to 50 percent.

FIG. 10 shows a case where the steering angle is medium (within the range of 60 to 100 degrees). The optical axis of the headlamp is fixed to +5 degrees. The quantity of radiation of the lamp 8R that is illuminating is maintained at the maximum (100 percent). The quantity of radiation of the lamp 9R that is illuminating gradually increases with an increase in the steering angle, reaching the maximum (100 percent) at a steering angle of 100 degrees. The lamp 10R comes on at a steering angle of 60 degrees and the quantity of radiation gradually increases with an increase in the steering angle, reaching some 50 percent at a steering angle of 100 degrees.

FIG. 11 shows a case where the steering angle is large (above 100 degrees). The optical axis of the headlamp is fixed to +5 degrees. The quantity of radiation of each of the lamps 8R, 9R that are illuminating is maintained at the maximum (100 percent). The quantity of radiation of the lamp 10R that is illuminating gradually increases with an increase in the steering angle, reaching the maximum (100 percent) at a steering angle of 180 degrees. Afterwards, the quantity of radiation is maintained at the maximum irrespective of an increase in the steering angle.

In case the wheel that has been turned is brought to the neutral position, each lamp 8, 9, 10 undergoes light distribution so that the quantity of radiation gradually decreases, based on the control conditions shown in FIG. 6. The quantity of radiation of the lamp 10R gradually decreases as the steering angle decreases from 160 degrees and drops to 0 at a steering angle of 60 degrees. The quantity of radiation of the lamp 9R gradually decreases as the steering angle decreases from 90 degrees and drops to 0 at a steering angle of 20 degrees. The quantity of radiation of the lamp 8R gradually decreases as the steering angle decreases from 30 degrees and drops to 0 at a steering angle of 10 degrees.

Thus, in this embodiment, when the wheel is turned, the illuminated area gradually expands in the direction where the wheel is turned, with an increase in the wheel turning angle or steering angle. Brightness of the illuminated area gradually increases in the steering direction. Thus it is very easy for a driver to check the area ahead of a vehicle in its moving direction, thereby providing easy driving.

Next, the relationship between the radiation control mode and radiation states of each lamp will be explained.

In this embodiment, radiation control mode is divided into three modes, city driving mode, suburban driving mode, and high-speed driving mode.

The city driving mode is used when driving through urban districts with many pedestrians and crossings, and is intended to allow a driver to fully recognize road users such as pedestrians during relatively low-speed driving. This mode has radiation objects such as "radiating the area ahead of a vehicle as far as the braking distance (more precisely, free running distance plus braking distance; about 32 meters for a speed of 50 km/h) at a certain driving speed", or "allowing a driver to fully check the ongoing vehicle's lane and the footway on the vehicle's lane side of a road having two lanes on one way."

The suburban driving mode is used for driving on rather winding roads with relatively low traffic. This mode is intended to allow a driver to check obstacles and curbs during medium-speed driving. This mode has radiation objects such as "radiating the area ahead of a vehicle as far as the braking distance at a certain driving speed (about 76 meters for a speed of 80 km/h)", or "securing a radiated range of a determined width (about 5 to 20 meters) using the vehicle as a reference on a road having two lanes on one way."

The high-speed driving mode is used for high-speed driving on a highly trafficked four-lane freeways or main trunk roads separated by glare-proof fences. This mode is intend to allow a driver to recognize a falling object and to radiate the area ahead of a vehicle as far as the distance where the object can be evaded (for example about 112 meters). In this mode, it is required to avoid providing the next vehicle ahead with a dazzling light (for example radiation onto a door mirror).

In this embodiment, selection control between the above modes can be made via a manual method, an auto method, or both. In the manual method, a driver can select a mode according to the judgement of the current situation by operating the radiation control mode selector switch 40. This approach is further divided into a method where judgement of the current situation is purely made by the driver, and a method wherein a recommended mode to suite the vehicle speed and driving environment is displayed as advice to the driver. In the auto method, mode selection is made based on a vehicle speed detection signal from the vehicle speed sensor 4, as shown in FIGS. 12 and 13. Further, for example, a detection means for detecting an instruction signal to a direction indicator can be used instead of the vehicle speed sensor 4. It is also possible to use a navigation system that makes use of GPS (Global Positioning System) satellites or road-to-vehicle communications as means for obtaining the current and future vehicle driving directions, based on map information including topography of roads and current position information on the vehicle.

Charts in FIGS. 12 and 13 show control examples of the lamps.

The chart in FIG. 12 is an example of the state of each mode and lamp for turning-on/off of a so-called sub beam (or low beam) assumed when the low beam is used. The chart in FIG. 13 is an example of the state of each mode and lamp for turning-on/off of a so-called main beam (or high beam) assumed when the high beam is used.

In these charts, the mark "○" indicates that a lamp is turned on and "X" that a lamp is turned off. "Steering angle" indicates a wheel steering angle (shown for either a left turn or right turn). "Turn ON" indicates turning-on/off of the turn signal lamp (not shown). "Bad weather" includes rainy weather and snowfall. In particular, for city driving and suburban driving, not high-speed driving, control is made so that the cornering lamp 10 in the steering direction reaches the maximum irrespective of the wheel steering angle, in case the turn signal lamp switch is turned ON.

The turn signal lamp switch is turned on some time, not immediately, before the vehicle makes a turn. In connection with the turn signal lamp switch being turned ON, the quantity of radiation of a cornering lamp 10 that radiates a predetermined radiated range ahead of a vehicle in its turning direction reaches the maximum before wheel steering irrespective of the wheel steering angle, thus illuminating the area ahead in the vehicle's turning direction. In this way it is possible to make a right or left turn at a crossing safely and smoothly.

For a transition between modes, a transition between the city driving mode and the suburban driving mode is specified at a threshold value of 40 km/h and a transition between the suburban driving mode and the high-speed driving mode is specified at a threshold value of 90 km/h. Specification can be made so that the threshold value of vehicle speed differs between acceleration and deceleration. For example, in the case of acceleration, a transition between the city driving mode and the suburban driving mode is specified at a threshold value of 50 km/h and a transition between the suburban driving mode and the high-speed driving mode is specified at a threshold value of 80 km/h. On the other hand, in the case of deceleration, a transition between the high-speed driving mode and the suburban driving mode is specified at a threshold value of 70 km/h and a transition between the suburban driving mode and the city driving mode is specified at a threshold value of 30 km/h.

Some threshold values are preset for steering angles where the auxiliary lamps 8, 9, 10 comes on or off. Such values differ between an increase in the steering angle and a decrease in the steering angle. That is, in this embodiment, threshold values are respectively preset for the lamps 8, 9, 10: 10 degrees (40 degrees) for the lamp 8, 20 degrees (100 degrees) for the lamp 9, and 60 degrees (180 degrees) for the lamp 10 in the increasing direction of the steering angle; and 160 degrees (60 degrees) for the lamp 10, 90 degrees (20 degrees) for the lamp 9, and 30 degrees (10 degrees) for the lamp 8 in the decreasing direction of the steering angle. In the increasing direction of the steering angle, a value within parentheses shows a steering angle where the quantity of radiation is the maximum (100 percent). In the decreasing direction of the steering angle, a value within parentheses shows a steering angle where the quantity of radiation is zero (0 percent).

In this way, when a vehicle is moving straight in the city driving mode, only headlamps 7 are turned on and the optical axis of each of the right and left headlamps is fixed to a position 1.5 degrees outward irrespective of the steering angle. That is, as shown by the broken line areas A7, A7 in FIG. 5, the axis of the headlamp on the right is shifted clockwise by 1.5 degrees and is fixed at that position, whereas the axis of the headlamp on the left is shifted counterclockwise by 1.5 degrees and is fixed at that position, thus securing a wider radiated range.

In the city driving mode, when the steering angle reaches 10 degrees during a left or right turn, the appropriate rain lamp 8 starts to come on. When the steering angle reaches 20 degrees, the appropriate bending lamp 9 starts to come on. When the steering angle exceeds 40 degrees, the quantity of light of the rain lamp 8 reaches the maximum. When the steering angle reaches 60 degrees, the appropriate cornering lamp 10 starts to come on. When the steering angle exceeds 100 degrees, the quantity of light of the bending lamp 9 reaches the maximum. When the steering angle exceeds 180 degrees, the quantity of light of the cornering lamp 10 reaches the maximum.

When the wheel is turned back and the steering angle drops below 160 degrees, the quantity of light of the cornering lamp 10 gradually decreases. When the steering angle drops below 90 degrees, the quantity of light of the bending lamps 9 gradually decreases. When the steering angle drops to 60 degrees, the cornering lamp goes off. When the steering angle drops below 30 degrees, the quantity of light of the rain lamp 8 gradually decreases. When the steering angle drops to 20 degrees, the bending lamp 9 goes off. And when the steering angle drops below 10 degrees, the rain lamp 8 goes off (all of the auxiliary lamps 8, 9, 10 are off at this point).

In this way, control is made so that the lamps 8, 9, 10 sequentially come on with an increase in the steering angle, and so that the radiated range expands in the wheel steering angle. Therefore, it is possible to secure sufficient illuminance and radiated range to assure driving in high-traffic places.

The quantity of radiation of the lamps 8, 9, 10 that come on gradually increases according to the steering angle. Thus the brightness of the radiated range in the vehicle's turning direction gradually increases without suddenly increasing. This prevents the driver from being perplexed and pedestrians from being surprised by a sudden brightness.

When a vehicle is moving straight in the suburban driving mode, only headlamps 7 are turned on and the optical axis of each headlamp is shifted according to the steering angle. For example, as the steering angle becomes larger from 0 degrees (neutral position) to 40 degrees, the direction of the optical axis is successively changed from 0 degrees to 5 degrees (absolute value). A dead zone is provided in order not to change the direction of the optical axis for a range of steering angle of 0 to 7 degrees. This prevents unwanted change in light distribution for the so-called "play" of the wheel.

When a vehicle is making a left turn or a right turn in the suburban driving mode, the rain lamps 8 and the bending lamps 9 come on according to an increase in the steering angle. Even when the steering angle exceeds 60 degrees, that is an illumination-controlled turning-on start angle for the cornering lamps 10, the cornering lamps 10 remain off. When the wheel is turned back, the quantity of light of the bending lamps 9 and rain lamps 8 starts to decrease at a steering angle of 90 degrees and 30 degrees, respectively. The bending lamps 9 go off at a steering angle of 20 degrees, whereas the rain lamps 8 go off at a steering angle of 10 degrees.

When a vehicle is moving straight in the high-speed driving mode, only headlamps 7 are turned on, and the optical axis of each headlamp is shifted according to the steering angle. For example, as the steering angle becomes larger from 0 degrees (neutral position) to 40 degrees, the direction of the optical axis is successively changed from 0 degrees to 5 degrees (absolute value). A dead zone is provided in order not to change the direction of the optical axis for a range of steering angle of 0 to 5 degrees. This prevents unwanted change in light distribution for the so-called "play" of the wheel.

Exemplary Reasons why a dead zone is provided for a steering angle in the suburban driving mode or high-speed driving mode are given below.

A driving situation where the steering angle varies in a subtle way includes subtle meandering or evasion of a small obstacle. A subtle change in the steering angle indicates a low probability of changing lanes or turning to another road.

Thus, it is not necessary to change the optical axis direction of headlamps 7 in response to a small change in the steering angle in the above cases. It is, rather, necessary to prevent disadvantages caused by changing the optical axis direction unreasonably.

While the rain lamps 8 come on via illumination control at a steering angle of 10 degrees or above in the high-speed driving mode, the bending lamps 9 and the cornering lamps 10 remain off even when the steering angle exceeds 20 degrees and 60 degrees, respectively, wherein such angles are usually illumination-controlled turning-on start angles for the bending lamps 9 and cornering lamps 10, respectively.

FIG. 14 is a schematic diagram of the light distribution pattern PS1 in the city driving mode and suburban driving mode wherein the sub beam of the headlamps 7 is turned on. The line "H—H" in the figure represents a horizontal line and the line "V—V" represents a perpendicular line.

As shown, in case road traffic regulations make it an obligation to drive on the right lane, the cut line (or cut off) CLa on the oncoming vehicle's lane (left of the line V—V) is positioned slightly below the horizontal line H—H (an angle display of 0.5 degrees) and the cut line (or cut off) CLb on the vehicle's lane (right of the line V—V) is positioned substantially along the horizontal line H—H.

FIG. 15 is a schematic diagram of the light distribution pattern PS2 in the high-speed driving mode the sub beam is turned on. The line "H—H" and the line "V—V" are similar to those mentioned earlier.

In this case, the cut line CLa on the left is elevated and the cut lines are positioned, as a whole, substantially along the horizontal line H—H.

FIG. 16 is a schematic diagram of the light distribution pattern PM of the headlamps 7 when the main beam is turned on. In this case, the pattern in this figure is one formed by elevating a predetermined height increment (an angle display of 1.5 degrees) for the pattern in FIG. 14, irrespective of the driving mode used.

In bad weather, the rain lamps positioned right and left at the front of the vehicle both come on. When a blinking instruction for a turn signal lamp is issued, the cornering lamps 10 come on at the maximum quantity of light.

For the rain lamps 8, a method using a manual switch is available. Alternatively, another method may be where the turning-on/off point is linked with the wiper operation switch.

While the foregoing embodiment uses different specifications, depending on driving mode, for turning-on and optical axis control of the headlamps for a vehicle moving straight, the same specifications for turning-on and optical axis control may be used irrespective of the driving mode. This does not limit the invention, but different specifications for turning-on and optical axis control my be used between radiation of the sub beam and radiation of the high beam. It is clear that such a variety of embodiments fall within the technical scope of the invention.

The width of the aforementioned dead zone for the steering angle, or width of angle using the steering center or a steering angle of 0 degrees, is set in a different way between driving modes. This does not limit the invention, but the width of the dead zone may be varied according to the vehicle speed.

The reason is that, in case control of the optical axis shift is faithfully made according to the steering angle, the driver feels more sensitive control in the radiation direction for the steering operation when the vehicle speed is low, and the driver feels less sensitive control in the radiation direction for the steering operation when the vehicle speed is high. This is caused by the fact that the compensation operation via the driver's steering operation is generally great when the vehicle is moving at a low speed whereas the compensation operation tends to become smaller as the vehicle speed increases.

Examples of control of the dead zone width (of the steering angle) according to the vehicle speed are listed below. (a) The dead zone width is varied by stages according to the vehicle speed. (b) The dead zone width is successively varied according to the vehicle speed. (c) Combination of the method (a) and the method (b).

An example of using the method (a) will now be described. For example, in the increasing direction of the vehicle speed, the dead zone width (angle range) is 9 degrees when the vehicle speed is below 40 km/h. When the vehicle speed exceeds 40 km/h, the dead zone width is decreased to 7 degrees. When the vehicle speed reaches 90 km/h, the dead zone width is dropped to 5 degrees. In the decreasing direction of the vehicle speed, the dead zone width is increased to 7 degrees when the vehicle speed drops to 70 km/h, and the dead zone width is increased to 9 degrees when the vehicle speed drops to 30 km/h. In this way, specifying hysteresis characteristics—by setting separate threshold values of vehicle speed for the increasing direction and the decreasing direction—elevates the sensitivity of control of radiation direction of the headlamps for the steering angle when the vehicle speed is high, and drops the sensitivity of control of radiation direction of the headlamps for the steering angle when the vehicle speed is low. This achieves a radiation control that does not perplex the driver.

Also, unnecessary radiation control for a steering operation may be prevented by suspending (or canceling) the linked control of the steering operation and the radiation direction of the lamps when the vehicle speed has dropped below a certain threshold value.

An example of using the method (b) will now be described. The dead zone width assumed when the vehicle speed is 0 is set to 9 degrees. As the vehicle speed increases, the dead zone width is gradually decreased. The dead zone width may be specified to correspond to the vehicle speed according to a predetermined control line (straight line or curve in a graph representing the vehicle speed on the axis of abscissas and the dead zone width on the axis of ordinates), so that the dead zone width will reach about 5 degrees when the vehicle speed has reached about 90 km/h.

For the method (c), for example, the vehicle speed range is divided into a plurality of sections and the method (a) may be used in some sections and method (b) in other sections. Another approach is that the method (a) or (b) is prespecified as the priority method for each of the sections.

Instead of varying the dead zone width according to the vehicle speed, variably controlling the control angle of radiated beam for the steering angle (radiation direction and angle) according to the vehicle speed can solve the problem of control sensitivity caused by the vehicle speed, thus realizing radiation control that does not perplex the driver. In this case, in a graph representing the steering angle on the axis of abscissas and the vehicle speed on the axis of ordinates, it suffices to vary the gradient of the control line that specifies the relationship between the steering angle and the vehicle speed according to the vehicle speed. That is, the gradient is increased with an increase in the vehicle speed. For example, when the control line is a straight line, each straight line according to the vehicle speed or vehicle speed range determines the control angle of the radiated beam for the steering angle. Specifying the straight line expression so that the gradient of the straight line increases as the vehicle speed becomes higher upgrades the control sensitivity as the vehicle speed becomes higher. While this method can be used independently, a combination of this method and the aforementioned control of the dead zone width will be more effective.

Figure 17:
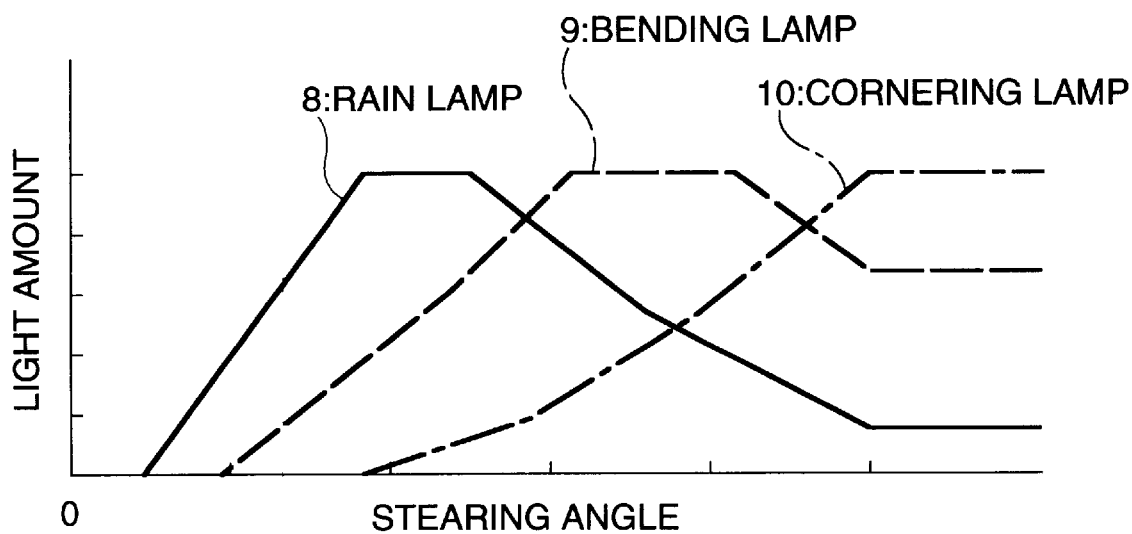
FIG. 17 shows the quantity of light of auxiliary lamps for the steering angle, according to a second embodiment of the invention.
Figure 18:
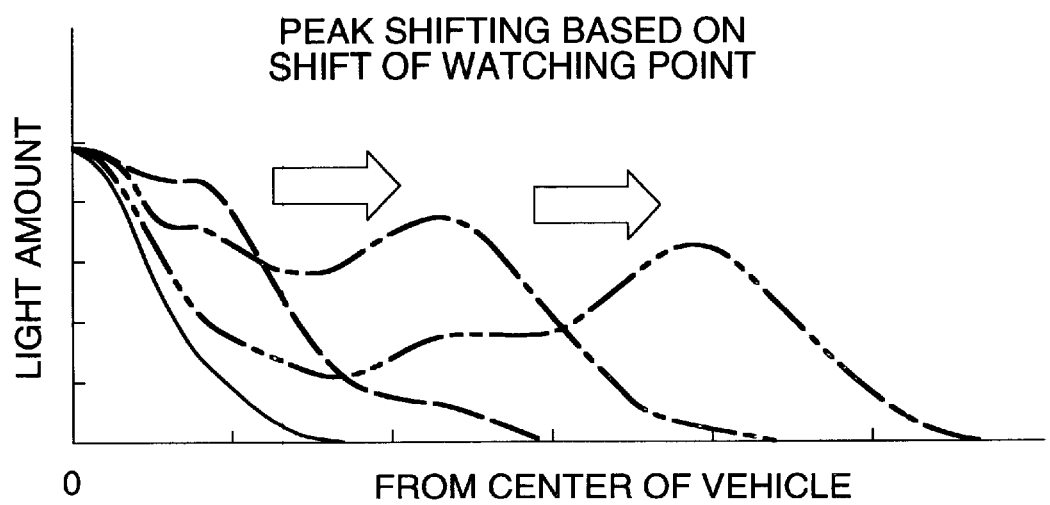
FIG. 18 shows how the peak of the radiated area shifts according to the wheel steering angle (as seen by the driver)
Figure 19:
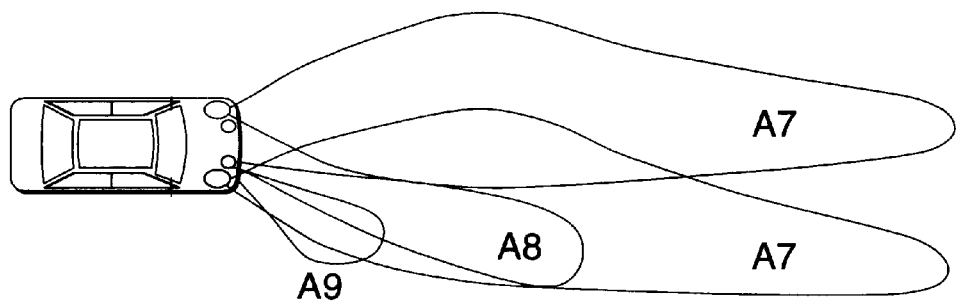
FIG. 19 is a schematic diagram showing the radiated ranges of headlamps and auxiliary lamps (where the steering angle is small)
Figure 20:
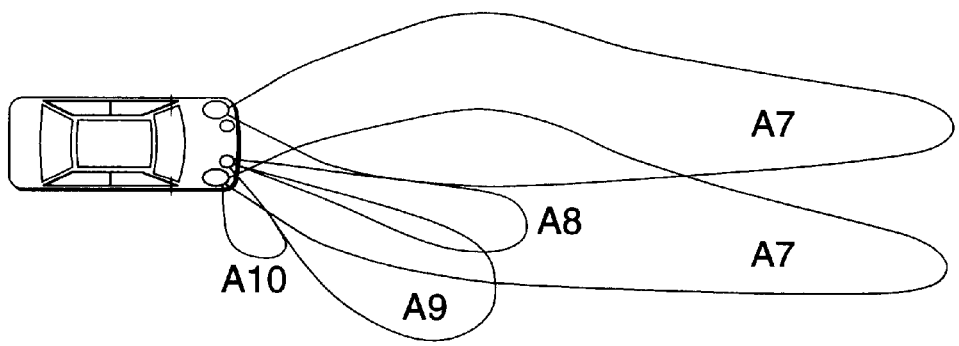
FIG. 20 is a schematic diagram showing the radiated ranges of headlamps and auxiliary lamps (where the steering angle is medium)
Figure 21:
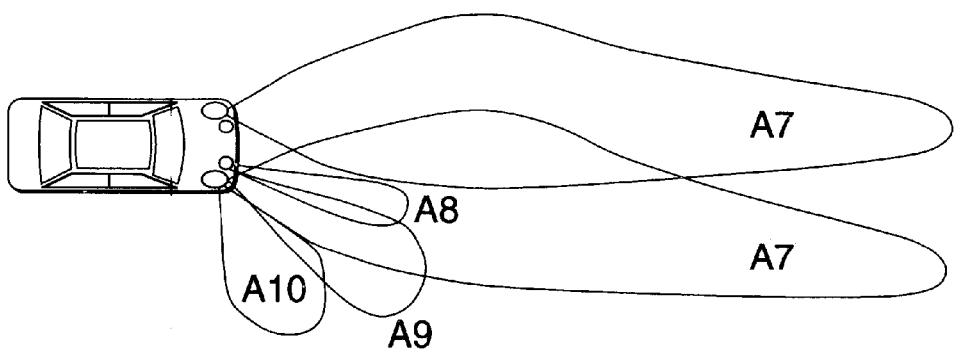
FIG. 21 is a schematic diagram showing the radiated ranges of headlamps and auxiliary lamps (where the steering angle is large)

FIGS. 17 through 21 show a second embodiment of the invention. FIG. 17 shows the quantity of light of the auxiliary lamps for the steering angle that is a key section of the lighting system for automobiles. FIG. 18 shows how the peak of the radiated area shifts according to the wheel steering angle (as seen from the driver). FIGS. 19 through 21 are schematic diagrams showing the radiated ranges of the headlamps and the auxiliary lamps. FIG. 19 shows a case where the steering angle is small. FIG. 20 shows a case where the steering angle is medium. FIG. 21 shows a case where the steering angle is large.

In the second embodiment, same as in the first embodiment, auxiliary lamps (rain lamps 8, bending lamps 9, cornering lamps 10) come on via illumination control when a predetermined steering angle is reached, and the quantity of radiation increases as the steering angle increases. However, as shown in FIG. 17, the lamps 8, 9, 10 are adapted so that the maximum quantity of radiation (100 percent) is maintained for a while once the maximum quantity of radiation is reached, and then when a predetermined steering angle is exceeded, the quantity of radiation is decreased with an increase in the steering angle.

The ECU unit 5, which is a radiation control means, is adapted to turn on the auxiliary lamps 8, 9, 10 above a predetermined steering angle and to increase the quantity of radiation of the lamps 8, 9, 10 with an increase in the steering angle, and is adapted to maintain the maximum quantity of radiation (100 percent) for a while once the maximum quantity of radiation is reached, and further is adapted to decrease the quantity of radiation of the auxiliary lamps 8, 9, 10 with an increase in the steering angle after a predetermined steering angle is exceeded.

Light distribution of all the auxiliary lamps 8, 9, 10 is synthetic light distribution where the quantity of light of the rain lamps 8 is the maximum when the steering angle is small; synthetic light distribution where the quantity of light of the cornering lamps 10 is the maximum when the steering angle is large; and synthetic light distribution where the quantity of light of the bending lamps 9 is the maximum when the steering angle is medium.

FIG. 19 shows a case where the steering angle is small. This case corresponds to FIG. 9 in the first embodiment. Light distribution formed by the auxiliary lamps 8, 9 is close to light distribution in the first embodiment, but the quantity of radiation of the rain lamps 8 is larger than that in FIG. 9, and the quantity of light of the radiated area corresponding to the driver's watch point is the maximum.

FIG. 20 shows a case where the steering angle is medium. This case corresponds to FIG. 10 in the first embodiment. but light distribution formed by the auxiliary lamps 8, 9 10 shows a larger quantity of light of the bending lamp 9 than that in FIG. 10. The quantity of radiation of the rain lamps 8 is low, and the quantity of light of the radiated area corresponding to the driver's watch point is the maximum.

FIG. 21 shows a case where the steering angle is small. This case corresponds to FIG. 11 in the first embodiment. but light distribution formed by the auxiliary lamps 8, 9, 10 shows a larger quantity of light of the cornering lamp 10 than that in FIG. 11. The quantity of radiation of the rain lamps 8 and the bending lamps 9 is low, and the quantity of light of the radiated area corresponding to the driver's watch point is the maximum.

In this way, in this embodiment, light is distributed to match the driver's watch point (turning direction). Such light distribution decreases the quantity of light of the areas other than the driver's watch point (turning direction) thus saving power consumption.

Figure 22:
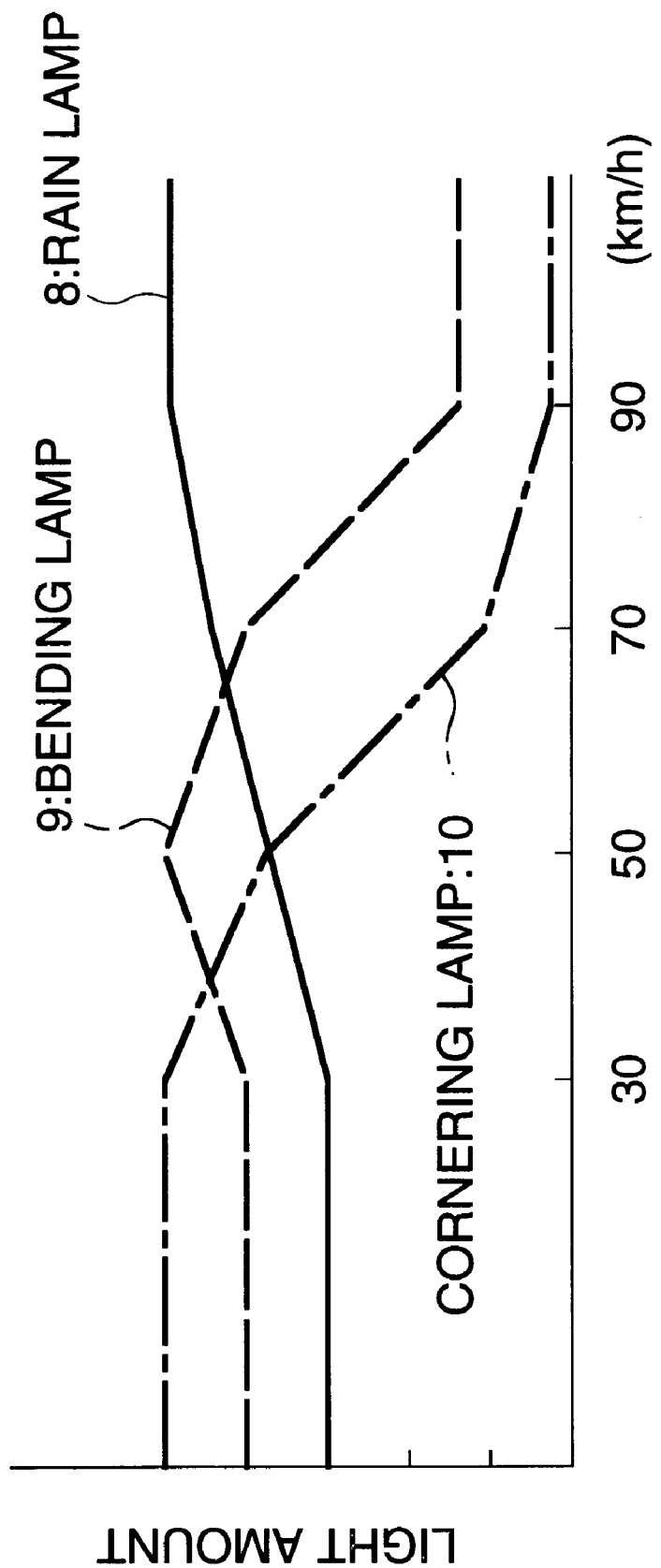
FIG. 22 shows the quantity of light of auxiliary lamps for the vehicle speed, according to a third embodiment of the invention.
Figure 23:
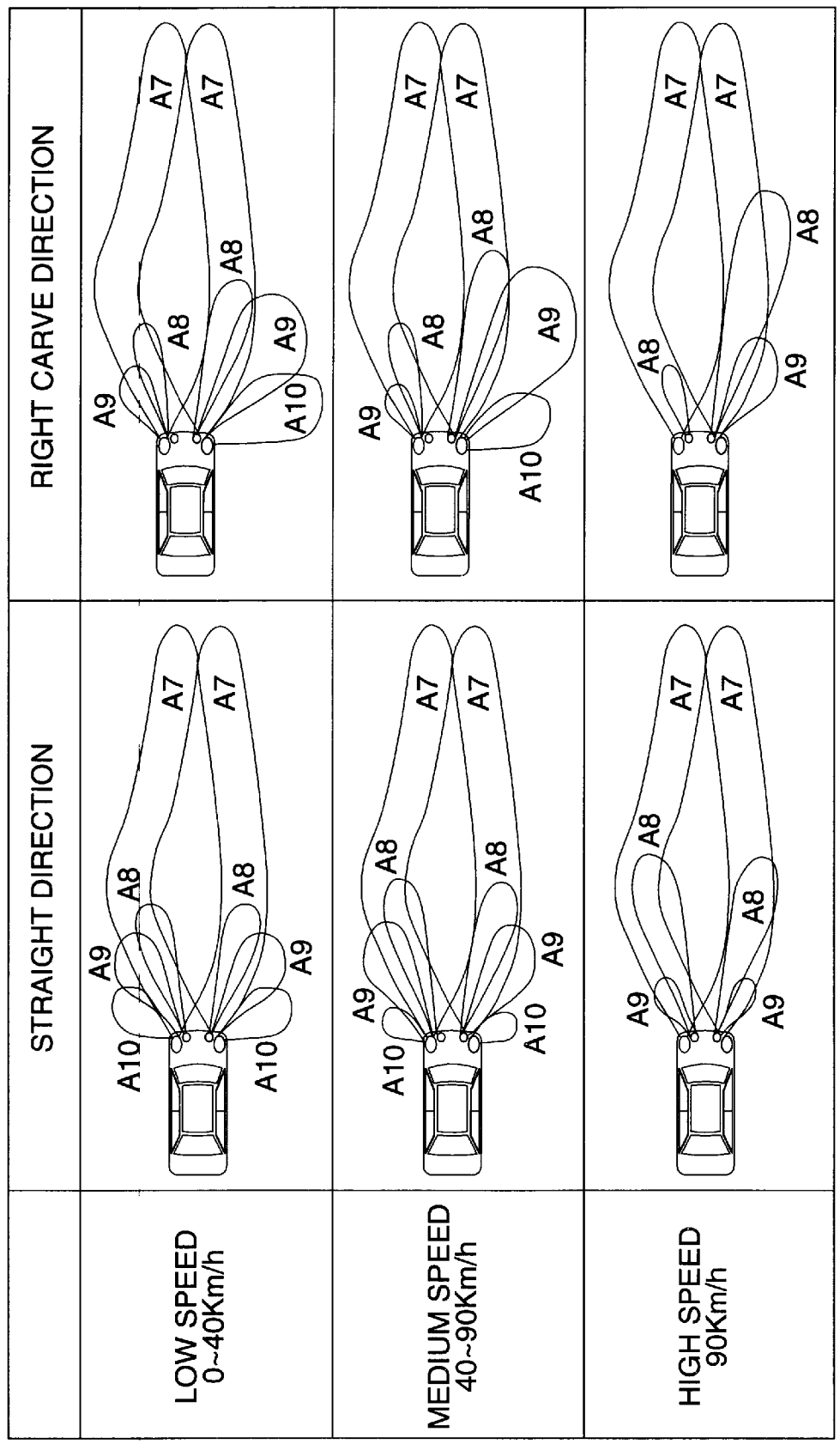
FIG. 23 is a schematic diagram of the radiated ranges of headlamps and auxiliary lamps as seen from above a vehicle.

FIGS. 22 and 23 show a third embodiment of the invention. FIG. 22 shows the quantity of light of auxiliary lamps according to the vehicle speed, that is a key section of the lighting system for automobiles. FIG. 23 is a schematic diagram of the radiated ranges of the headlamps and the auxiliary lamps as seen from above.

The lighting system in the first and the second embodiments, as mentioned earlier, is adapted to vary the quantity of radiation of the auxiliary lamps 8, 9, 10 according to the wheel steering angle, but the lighting system is not adapted to vary the quantity of radiation according to the vehicle speed. In the third embodiment, a more proper light distribution is obtained during driving by controlling the quantity of radiation of the auxiliary lamps 8, 9, 10 so that the quantity of radiation of the radiated area ahead of a vehicle becomes smaller and the quantity of radiation of the radiated area sideways of the vehicle becomes larger as the vehicle speed becomes lower, and so that the quantity of radiation of the radiated area ahead of a vehicle becomes larger and the quantity of radiation of the radiated area sideways of the vehicle becomes smaller as the vehicle speed becomes higher.

Since the driver's field of view is generally wide during low-speed driving and the driver senses a narrower field of view as the vehicle speed becomes higher, the driver senses a smaller and smaller dispersion of light responsive to wheel steering when the vehicle speed is low. On the other hand, the driver senses a larger dispersion of light responsive to wheel steering and becomes less sensitive to a change in the brightness responsive to wheel steering when the vehicle speed is high.

By controlling the quantity of radiation of the auxiliary lamps 8, 9, 10 so that the quantity of radiation of the radiated area ahead of a vehicle becomes smaller and the quantity of radiation of the radiated area sideways of the vehicle becomes larger as the vehicle speed becomes lower, and so that the quantity of radiation of the radiated area ahead of a vehicle becomes larger and the quantity of radiation of the radiated area sideways of the vehicle becomes smaller as the vehicle speed becomes higher, difference in sensing of dispersion of light responsive to wheel steering caused by difference in the vehicle speed is canceled and the driver senses a constant change in the brightness responsive to wheel steering irrespective of the vehicle speed.

In particular, as shown in FIG. 22, the ECU unit 5 controls turning-on of all the lamps 8, 9, 10 via illumination control so that synthetic light distribution around the cornering lamps 10 is formed in case the vehicle speed is low, and synthetic light distribution around the rain lamps 8 is formed in case the vehicle speed is high. Via this configuration, side visibility is upgraded in case the vehicle speed is low and forward visibility is upgraded in case the vehicle speed is high (see the example of light distribution control during straight moving in FIG. 23).

The ECU unit 5, as shown in the example of light distribution control during turning in FIG. 23, sequentially turns on the lamps 8, 9, 10 as necessary according to the wheel steering angle and controls the corresponding quantity of radiation in order to support a change in driving on a winding road as well. In principle, control is made so that the quantity of radiation of the lamps 8, 9, 10 increases as the wheel is turned. By limiting the ratio of quantity of radiation of the lamps 8, 9, 10 to the vehicle speed as shown in FIG. 22, light distribution that matches the driving state is realized.

As shown in the example of light distribution control during turning in FIG. 23, synthetic light distribution around the lamps 10 is formed as the wheel is turned when the vehicle speed is low, thus providing light distribution that focuses on side visibility. In contrast, synthetic light distribution around the lamps 8 is formed in case the vehicle speed is high, thus providing light distribution that focuses on forward visibility. Lastly, when the vehicle speed is medium, light distribution lies in the intermediate position of the two above-described cases.

Figure 24:
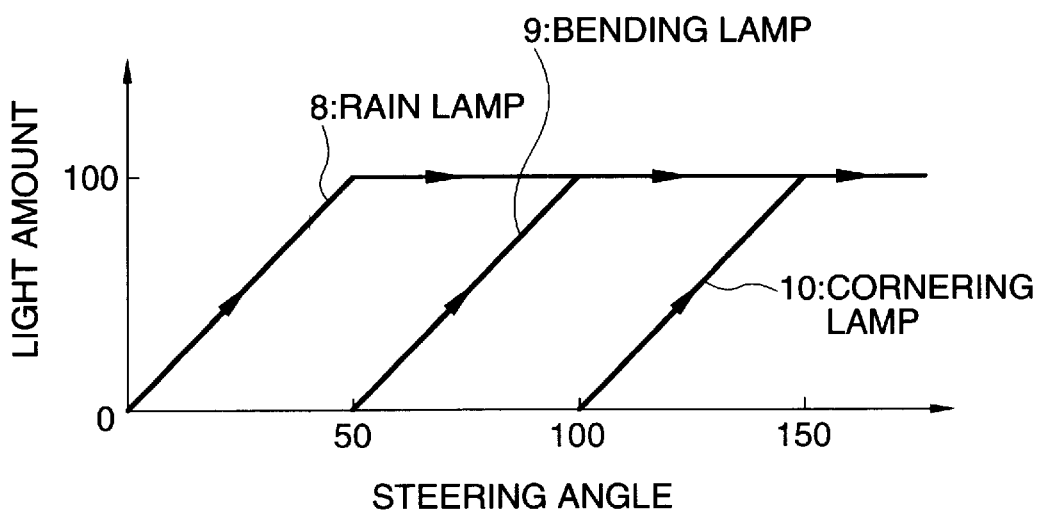
FIG. 24 shows the quantity of light of auxiliary lamps according to the steering angle, according to a fourth embodiment of the invention.

FIG. 24 shows a fourth embodiment of the invention and the quantity of light of auxiliary lamps according to the steering angle that is a key section of the lighting system for automobiles.

In each of the aforementioned embodiments (for example, in the first embodiment), the ECU unit 5 is adapted to start turning on the auxiliary lamps 9 whose radiated range is adjacent to that of the auxiliary lamps 8 via illumination control while the quantity of radiation of the auxiliary lamps 8 is increasing, and is adapted to start turning on the auxiliary lamps 10 whose radiated range is adjacent to that of the auxiliary lamps 9 via illumination control while the quantity of radiation of the auxiliary lamps 9 is increasing. In the fourth embodiment, the ECU unit 5 is adapted to start turning on the auxiliary lamps 9 whose radiated range is adjacent to that of the auxiliary lamps 8 via illumination control at the same time as the quantity of radiation of the auxiliary lamps 8 reaches the maximum and to start turning on the auxiliary lamps 10 whose radiated range is adjacent to that of the auxiliary lamps 9 via illumination control at the same time as the quantity of radiation of the auxiliary lamps 9 reaches the maximum.

In the first embodiment, there exists a state where the quantity of light of a plurality of adjacent auxiliary lamps, for example, the quantity of radiation of the lamps 9 (or lamps 10) increases while the quantity of radiation of the lamps 8(or lamps 9) is increasing. Thus the increase ratio of the quantity of radiation via all of the auxiliary lamps is large. On the other hand, in this embodiment, the quantity of radiation of a single pair of auxiliary lamps increases or decreases, for example, the quantity of radiation of the lamps 9 (or lamps 10) increases at the same time as the quantity of radiation of the auxiliary lamps 8 (or lamps 9) reaches the maximum, not while the quantity of radiation of the lamps 8(or lamps 9) is still increasing. Thus, the increase ratio of the quantity of radiation via all of the auxiliary lamps is seamless. The illuminated area seamlessly expands as the wheel is turned and increases the brightness seamlessly. Therefore, this embodiment is excellent in winding road situations.

Figure 25:
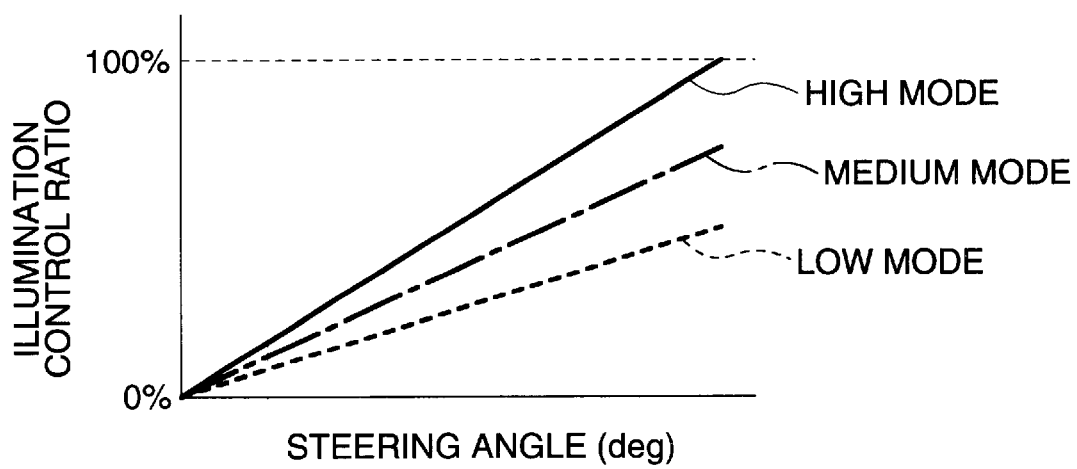
FIG. 25 shows the illumination control ratio of auxiliary lamps according to the steering angle, according to a fifth embodiment of the invention.

FIG. 25 shows a fifth embodiment of the invention and the illumination control ratio of auxiliary lamps according to the steering angle that is a key section of the lighting system for automobiles.

A lighting system for vehicles according to this embodiment comprises an illumination control mode selector switch for selecting one of a plurality of levels of quantity of radiation (illumination control ratio) for all of the auxiliary lamps 8, 9, 10 by three stages. Additionally, the ECU unit 5 is adapted to control the quantity of radiation (illumination control ratio) of the auxiliary lamps 8, 9, 10, based on the illumination control mode selected via this illumination control mode selector switch.

Assume a case where the voltage applied to lamps and the luminous flux of the bulb as a light source is in non-linear relationship. Providing a linear relationship between the steering angle and the voltage applied to lamps (illumination control ratio) does not vary the brightness of the lamps very much when the wheel is slightly turned from the neutral position. As the wheel is further turned, a change in the brightness suddenly becomes large. In this way, a non-linear relationship between the steering angle and the luminous flux of the bulb results in perplexing lamp illumination.

It is thus preferable to set a linear relationship between the steering angle and the luminous flux of the bulb so as to perform an illumination control of lamps that does not perplex a driver.

The illumination control ratio of the auxiliary lamps 8, 9, 10 is adapted to be selected between three illumination control modes, via the illumination control mode selector switch, as shown in FIG. 25 the high illumination control mode wherein the relationship between the steering angle and the luminous flux of the bulb is linear and the maximum illumination control ratio is 100 percent; the medium illumination control mode where the relationship between the steering angle and the luminous flux of the bulb is linear and the maximum illumination control ratio is 80 percent; and the low illumination control mode where the relationship between the steering angle and the luminous flux of the bulb is linear and the maximum illumination control ratio is 60 percent.

When driving in a very bright place with a number of city lights, the low illumination control mode may be selected. When diving in a very dark place, like on mountain roads, the high illumination control mode may be selected. In this way, the quantity of radiation of the lamps 8, 9, 10 may be controlled based on a proper illumination control mode that does not waste the quantity of light. This light distribution provides a substantially linear relationship between the steering angle and the brightness of the radiated area, and does not perplex the driver.

Selection of an illumination control mode may be made manually or automatically from the brightness of an image captured via image processing that is based on information from a forward shooting camera.

Advantages of the Invention

As understood from the foregoing description, according to a first aspect of the invention, the brightness of the radiated area in the vehicle's turning direction gradually increases according to the steering angle. This provides a driver with excellent visibility of the area ahead of the vehicle in its moving direction (vehicle's turning direction) without perplexing the driver. This also prevents pedestrians from being surprised by a sudden brightness.

According to the second aspect of the invention, the magnitude and brightness of the radiated range in the vehicle's turning direction seamlessly and gradually expand according to the steering angle, thus providing a driver with excellent visibility.

According to the third aspect of the invention, the magnitude and brightness of the radiated range in the vehicle's turning direction gradually increase according to the steering angle. This provides a driver with excellent visibility in the forward direction without perplexing the driver, thus securing further driving safety.

According to the fourth aspect of the invention, the magnitude and brightness of the radiated range in the vehicle's turning direction gradually and seamlessly increase according to the steering angle because the quantity of light of other lamps whose radiated ranges are adjacent from right to left increases about at the same time as the quantity f radiation of the first lamp reaches a maximum. This provides a driver with excellent visibility in the forward direction without perplexing the driver, thus securing further driving safety.

According to the fifth aspect of the invention, a wide area in the vehicle's turning direction is illuminated with a substantially constant quantity of light during driving on a winding road, thus providing a driver with excellent visibility in the forward direction during such driving.

According to the sixth aspect of the invention, the area in the vehicle's turning direction is illuminated most brightly during driving on a winding road, thus providing a driver with excellent visibility and saving power consumption.

According to the seventh aspect of the invention, the quantity of radiation of dimmer lights is controlled and difference in sensing of dispersion of light responsive to wheel steering caused by difference in the vehicle speed is canceled. Thus a driver feels a constant visibility ahead of and sideways from the vehicle, and enjoys easy wheel steering during light distribution control responsive to wheel steering in all vehicle speed states from low speed to high speed.

According to the eighth aspect of the invention, it is possible to save power consumption by controlling the quantity of radiation of lamps based on a proper illumination control mode that does not waste the quantity of light. Such control includes, for example, selecting a low illumination control mode when driving in a very bright place with a number of city lights, and selecting a high illumination control mode when diving in a very dark place like on mountain roads.

According to the ninth aspect of the invention, the area ahead of a vehicle in its turning direction is brightly illuminated upon turning on the turn signal lamp switch irrespective of wheel steering. Thus, it is possible to make right or left turns at crossings more safely and smoothly.

According to the tenth aspect of the invention, it is possible to realize a more proper light distribution control during driving by additionally using variable optical axis lamps whose optical axes vary in connection with the wheel steering angle. This secures further driving safety.

According to the eleventh aspect of the invention, the area ahead of a vehicle in its moving direction is properly illuminated by headlamps in connection with the wheel steering angle and the area in the vehicle's turning direction is gradually illuminated by auxiliary lamps according to the steering angle. This provides a driver with excellent visibility of the area ahead of the vehicle in its moving direction during both driving on a straight road and driving on a winding road—and also provides excellent visibility in the vehicle's turning direction when driving on a winding road—without perplexing the driver, thus securing the driving safety. This also prevents pedestrians from being surprised by a sudden brightness.

The present invention is not limited to the specific above-described embodiments. It is contemplated that numerous modifications may be made to the vehicle lighting system of the present invention without departing from the spirit and scope of the invention as defined in the following claims.

What is claimed is:

1. A lighting system, for vehicles, comprising:

headlamps mainly radiating the area ahead of a vehicle;

a plurality of dimmer lamps provided at the front of the vehicle in its moving direction, said lamps being disposed on the vehicle so that the radiated range of each of said lamps is adjacent to that of another in one of right and left directions, wherein the quantity of radiation of each lamp is variable;

a steering sensor for detecting a steering angle of the vehicle;

a vehicle speed sensor that detects the speed of the vehicle; and radiation control means for changing the combination of radiated ranges of said lamps to achieve light distribution ahead and sideways of a vehicle by specifying turning-on and turning-off of said plurality of lamps, and also by specifying the quantity of light of each lamp, according to the steering angle as detected by said steering sensor, wherein said radiation control means is adapted to sequentially turn on lamps having respective predetermined radiated ranges ahead, and to the side, of a vehicle according to the steering angle as detected by said steering sensor, further wherein said radiation control means is adapted to increase and decrease the quantity of radiation of each lamp according to the steering angle, and wherein said radiation control means is adapted to control the quantity of radiation of said plurality of dimmer lamps according to the vehicle speed by controlling the quantity of radiation of said plurality of dimmer lamps so that the quantity of radiation of the radiated area sideways of the vehicle becomes larger as the vehicle speed becomes lower, and by controlling the quantity of radiation of said plurality of dimmer lamps so that the quantity of radiation of the radiated area sideways of the vehicle becomes smaller as the vehicle speed becomes higher.

2. A lighting system for vehicles according to claim 1, wherein said radiation control means is further adapted to turn on a first one of said plurality of dimmer lamps, and then turn on other ones of said plurality of dimmer lamps having adjacent radiated ranges while the first lamp is still on.

3. A lighting system for vehicles according to claim 1, wherein said radiation control means is further adapted to turn on a first one of said plurality of dimmer lamps, and then to sequentially turn on other ones of said plurality of dimmer lamps whose radiated ranges are adjacent from right to left while controlling the quantity of radiation of the first lamp.

4. A lighting system for vehicles according to claim 1, wherein said radiation control means is further adapted to turn on a first one of said plurality of dimmer lamps, and then to sequentially turn on other ones of said plurality of dimmer lamps, whose radiated ranges are adjacent from right to left, about at the same time as the quantity of radiation of the first lamp is set to a maximum.

5. A lighting system for vehicles according to claim 1, wherein said radiation control means is further adapted to turn on each of said plurality of dimmer lamps at respective predetermined steering angles, to increase the quantity of radiation of each lamp as the steering angle increases, and to maintain, once the quantity of radiation of each lamp has reached a predetermined value, the quantity of radiation of the lamp at the predetermined value irrespective of an increase in the steering angle.

6. A lighting system for vehicles according to claim 1, wherein said radiation control means is further adapted to turn on each of said plurality of dimmer lamps at respective predetermined steering angles, to increase the quantity of radiation of each lamp as the steering angle increases, and to lower, once the quantity of radiation of the lamp has reached a predetermined value, the quantity of radiation of the lamp according to an increase in the steering angle.

7. A lighting system for vehicles according to claim 1, further comprising:

a vehicle speed sensor that detects the speed of the vehicle, wherein said radiation control means is adapted to control the quantity of radiation of said plurality of dimmer lamps according to the vehicle speed by controlling the quantity of radiation of said plurality of dimmer lamps so that the quantity of radiation of the radiated area ahead of a vehicle becomes smaller as the vehicle speed becomes lower, and by controlling the quantity of radiation of said plurality of dimmer lamps so that the quantity of radiation of the radiated area ahead of a vehicle becomes larger as the vehicle speed becomes higher.

8. A lighting system for vehicles according to claim 1, further comprising:

an illumination control mode selector switch for selecting, by a plurality of stages, one of a plurality of levels of quantity of radiation of all of said plurality of dimmer lamps, wherein said radiation control means is further adapted to control the quantity of radiation of said plurality of dimmer lamps based on the illumination control mode selected via said illumination control mode selector switch.

9. A lighting system for vehicles according to claim 1, further comprising a turn signal lamp switch, wherein said radiation control means is further adapted to control the quantity of radiation of a predetermined one of said plurality of dimmer lamps to provide the maximum quantity of radiation of said one lamp when the turn signal lamp switch is turned ON, irrespective of the wheel steering angle.

10. A lighting system for vehicles according to claim 1, wherein at least one of said plurality of dimmer lamps is a sub lamp for mainly radiating white lines on a road or shoulders.

11. A lighting system for vehicles according to claim 1, wherein at least one of plurality of dimmer lamps is a sideways radiating lamp having a radiated range from diagonally ahead to sideways of a vehicle.

12. A lighting system for vehicles according to claims 1 to 11, comprising variable optical axis lamps whose optical axes vary in right and left directions in connection with the steering angle.

13. A lighting system for vehicles according to claim 12, wherein said variable optical axis lamps are composed of said headlamps, and
further wherein said dimmer lamps are composed of auxiliary lamps for illuminating the areas ahead of and around a vehicle, said auxiliary lamps comprising: said sub lamp for mainly radiating white lines on a road or shoulders; said sideways radiating lamp having a radiated range from diagonally ahead to sideways of a vehicle; and a lamp for radiating the area in the diagonally forward direction having a radiated range located between that of said sub lamp and that of said sideways radiating lamp.

14. A lighting system for vehicles according to claim 13, wherein said sub lamp is turned on by detecting a meteorological information.

15. A lighting system for vehicles according to claim 1, wherein timings of turning-on and turning-off of said plurality of lamps are predetermined by threshold values in connection with values of said steering angles, said values being different between an increase in the steering angle and a decrease in the steering angle.

16. A lighting system for vehicles according to claim 1, wherein said head lamps are comprised of variable optical axis lamps whose optical axes vary in connection with a first steering angle, and further wherein width of a dead zone is predetermined for a second steering angle not varying said optical axes, said second steering angle being varied in accordance with a vehicle speed.

17. A lighting system for vehicles according to claim 1, wherein said head lamps are comprised of variable optical axis lamps whose optical axes vary in connection with a steering angle, and further wherein a controlled angle of radiated beam corresponding to said steering angle is varied in accordance with a vehicle speed.

* * * * *